US011276182B2

(12) United States Patent
Suegami et al.

(10) Patent No.: US 11,276,182 B2
(45) Date of Patent: Mar. 15, 2022

(54) ASSISTING VISUAL MOTION PERCEPTION IN THE EXTREME PERIPHERY

(71) Applicants: California Institute of Technology, Pasadena, CA (US); Yamaha Hatsudoki Kabushiki Kaisha, Iwata (JP); Mark Changizi, Pasadena, CA (US)

(72) Inventors: Takashi Suegami, Shizuoka (JP); Mark Changizi, Columbus, OH (US); Shinsuke Shimojo, Pasadena, CA (US); Christopher C. Berger, Pasadena, CA (US); Daw-An Wu, Pasadena, CA (US); Hirofumi Mochizuki, Shizuoka (JP)

(73) Assignees: California Institute of Technology, Pasadena, CA (US); Yamaha Hatsudoki Kabushiki Kaisha, Iwata (JP); Mark Changizi, Pasadena, CA (US)

( * ) Notice: Subject to any disclaimer, the term of this patent is extended or adjusted under 35 U.S.C. 154(b) by 139 days.

(21) Appl. No.: 16/735,590

(22) Filed: Jan. 6, 2020

(65) Prior Publication Data
US 2020/0311951 A1 Oct. 1, 2020

Related U.S. Application Data

(60) Provisional application No. 62/880,557, filed on Jul. 30, 2019, provisional application No. 62/879,971, (Continued)

(51) Int. Cl.
*G06T 7/246* (2017.01)
*G06T 7/73* (2017.01)
(Continued)

(52) U.S. Cl.
CPC .............. *G06T 7/248* (2017.01); *G06F 3/011* (2013.01); *G06F 3/017* (2013.01); *G06F 3/16* (2013.01);
(Continued)

(58) Field of Classification Search
CPC combination set(s) only.
See application file for complete search history.

(56) References Cited

U.S. PATENT DOCUMENTS

2015/0273179 A1* 10/2015 Krueger .................. G01C 9/12
600/27
2015/0309316 A1* 10/2015 Osterhout ............... G06F 3/012
345/8

(Continued)

FOREIGN PATENT DOCUMENTS

EP           3375681 A1    9/2018
JP         2018120290 A    8/2018

OTHER PUBLICATIONS

Kristina Schmiedchen , "Crossmodal interactions and multisensory integration in the perception of audio-visual motion" —May 14, 2012, A free-field study—Brain Research 1466(2021) 99-111— SciVerse ScienceDirect, pp. 99-109.*

(Continued)

*Primary Examiner* — Omar S Ismail
(74) *Attorney, Agent, or Firm* — Sheppard, Mullin, Richter & Hampton LLP

(57) ABSTRACT

Disclosed herein include systems, devices, computer readable media, and methods for enhancing human visual motion perception in the periphery (e.g., the far periphery, or the extreme periphery) or improving user safety using, for example, at least one auditory stimulus with a falling pitch.

25 Claims, 19 Drawing Sheets

Related U.S. Application Data filed on Jul. 29, 2019, provisional application No. 62/826,540, filed on Mar. 29, 2019.

(51) Int. Cl.
　　*H04W 4/029*　　(2018.01)
　　*H04W 4/38*　　(2018.01)
　　*G06F 3/16*　　(2006.01)
　　*G06F 3/01*　　(2006.01)

(52) U.S. Cl.
　　CPC .............. *G06T 7/74* (2017.01); *H04W 4/029* (2018.02); *H04W 4/38* (2018.02); *G06T 2207/30241* (2013.01); *G06T 2207/30252* (2013.01)

(56) References Cited

U.S. PATENT DOCUMENTS

| | | | |
|---|---|---|---|
| 2017/0043782 | A1 | 2/2017 | Farrell et al. |
| 2017/0150907 | A1* | 6/2017 | Duffy .................... A61B 5/411 |
| 2017/0253252 | A1* | 9/2017 | Donnelly .............. G06F 3/0338 |
| 2018/0268695 | A1 | 9/2018 | Agnew et al. |
| 2019/0049968 | A1 | 2/2019 | Dean et al. |
| 2019/0054927 | A1 | 2/2019 | Hayakawa |
| 2019/0121522 | A1* | 4/2019 | Davis .................. G06F 3/04815 |

OTHER PUBLICATIONS

Amanda Kaas , "Imagery of a moving object: The role of occipital cortex and human MT/V5+"—Jul. 29, 2009, NeuroImage 49 (2010) 794-804—ScienceDirect, pp. 796,802.*

Peter W. Battaglia , "Bayesian integration of visual and auditory signals for spatial localization-"—Jul. 2003, vol. 20, No. 7/Jul. 2003/J. Opt. Soc. Am. A 1391, pp. 1391-1394.*

Amanda Kaas , "Imagery of a moving object: The role of occipital cortex and human MTN5+"—Jul. 29, 2009, NeuroImage 49 (2010) 794-804—ScienceDirect, pp. 796,802.*

Baier et al., "Cross-Modal Processing in Early Visual and Auditory Cortices depends on Expected Statistical Relationship of Multisensory Information," The Journal of Neuroscience 2006, 26(47), 12260-12265.

Frassinetti et al., "Acoustical Vision of Neglected Stimuli: Interaction among Spatially Converging Audiovisual Inputs in Neglect Patients," Journal of Cognitive Neuroscience 2002, 14(1), 62-69.

Schmiedchen et al., "Crossmodal interactions and multisensory integration in the perception of audio-visual motion—A free-field study," Brain Research 2012, 1466, 99-111.

Simpson, "Mini-review: Far peripheral vision," Vision Research 2017, 140, 96-105.

Suegami et al., "Illusory color induced by colored apparent-motion in the extreme-periphery," Vision Sciences Society 17th Annual Dinner and Demo Night 2019.

Suegami et al., "Auditory Cue Suppresses Visual Detection in Extreme-Periphery," 41st European Conference on Visual Perception (ECVP) 2018.

Suegami et al., "Falling Pitch Imitating Doppler Shift Facilitates Detection of Visual Motion in The Extreme-Periphery," The 15th Asia-Pacific Conference on Vision (APVC) 2019.

Takeshima & Gyoba, "Complexity of visual stimuli affects visual illusion induced by sound," Vision Research 2013, 91, 1-7.

International Search Report and Written Opinion dated May 14, 2020 in PCT Patent Application No. PCT/US2020/012425.

* cited by examiner

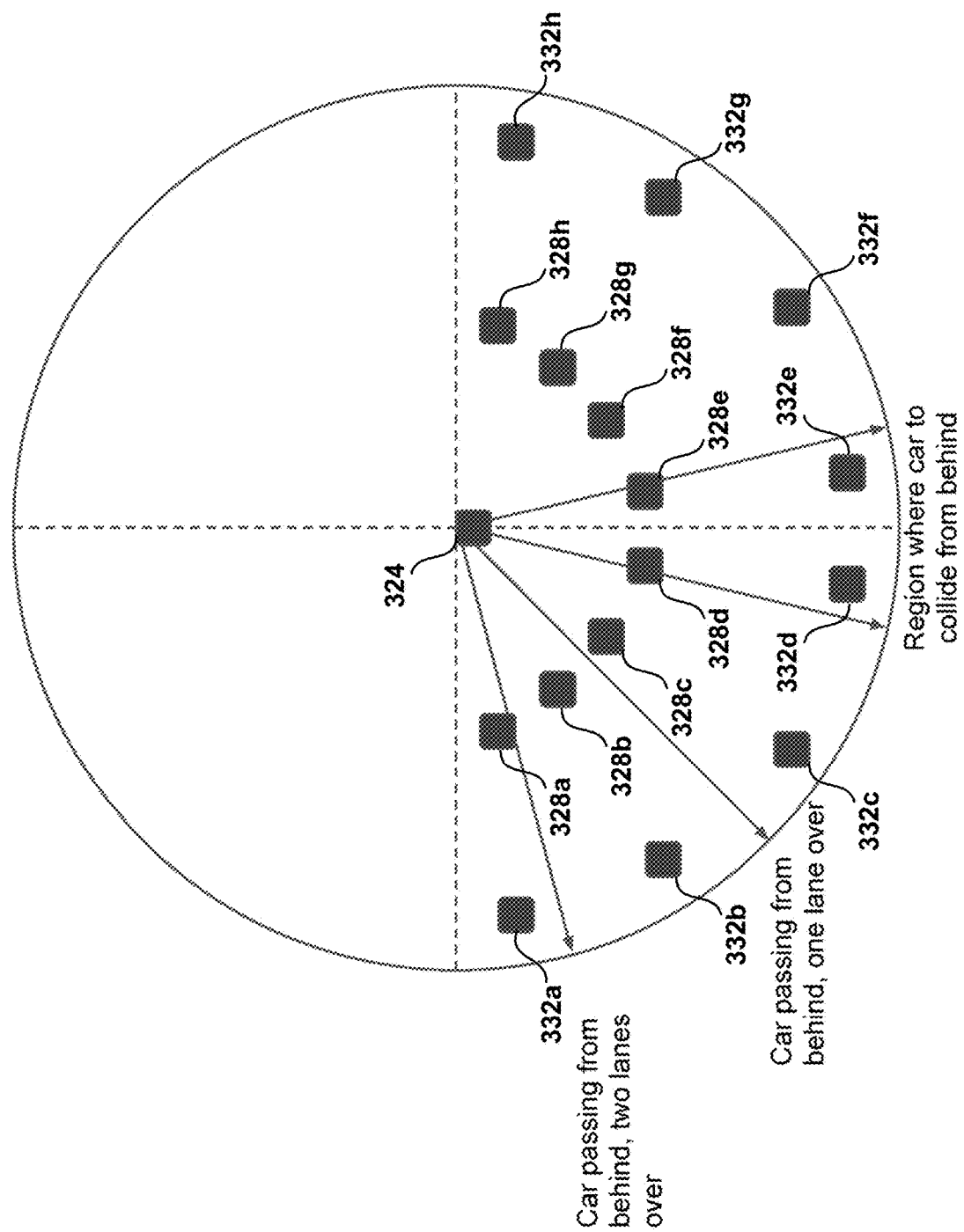

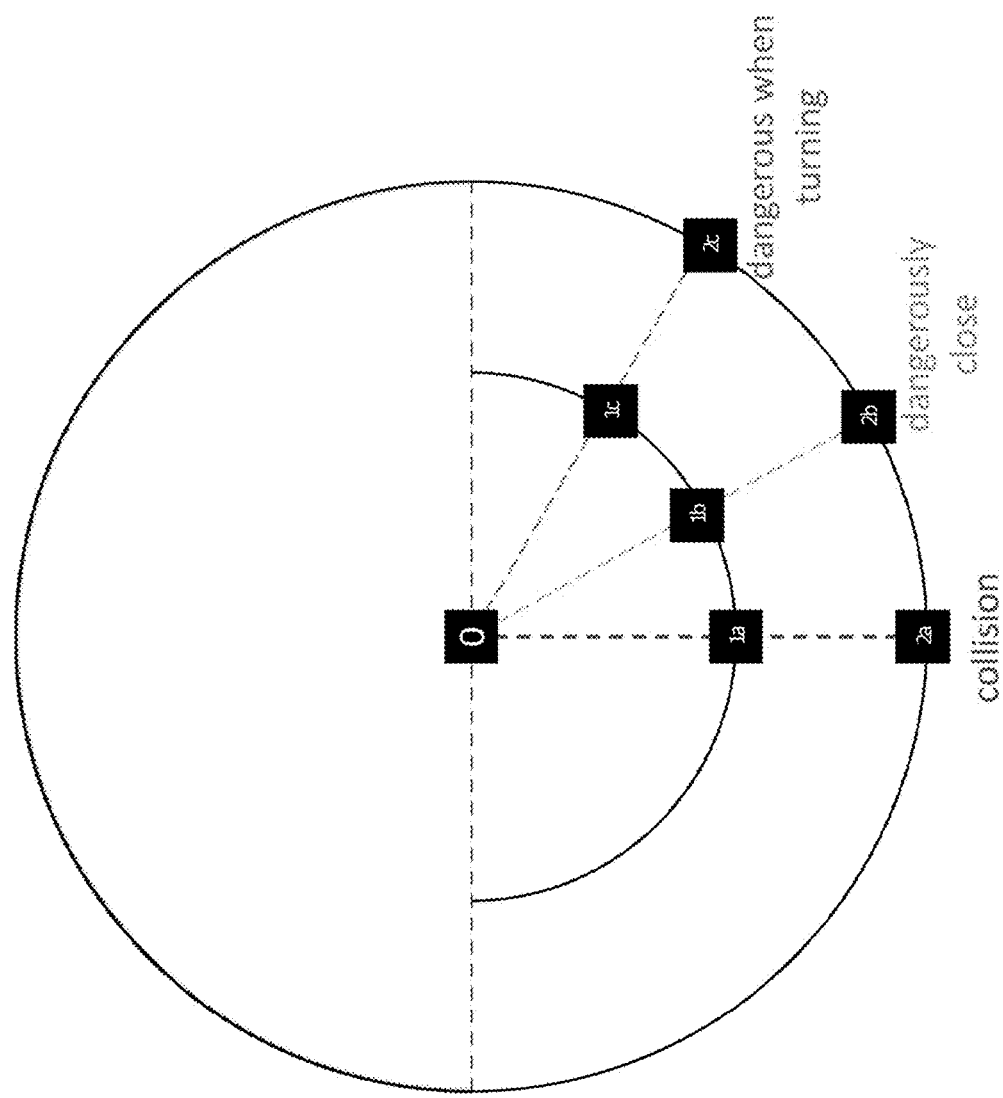
FIG. 4B1

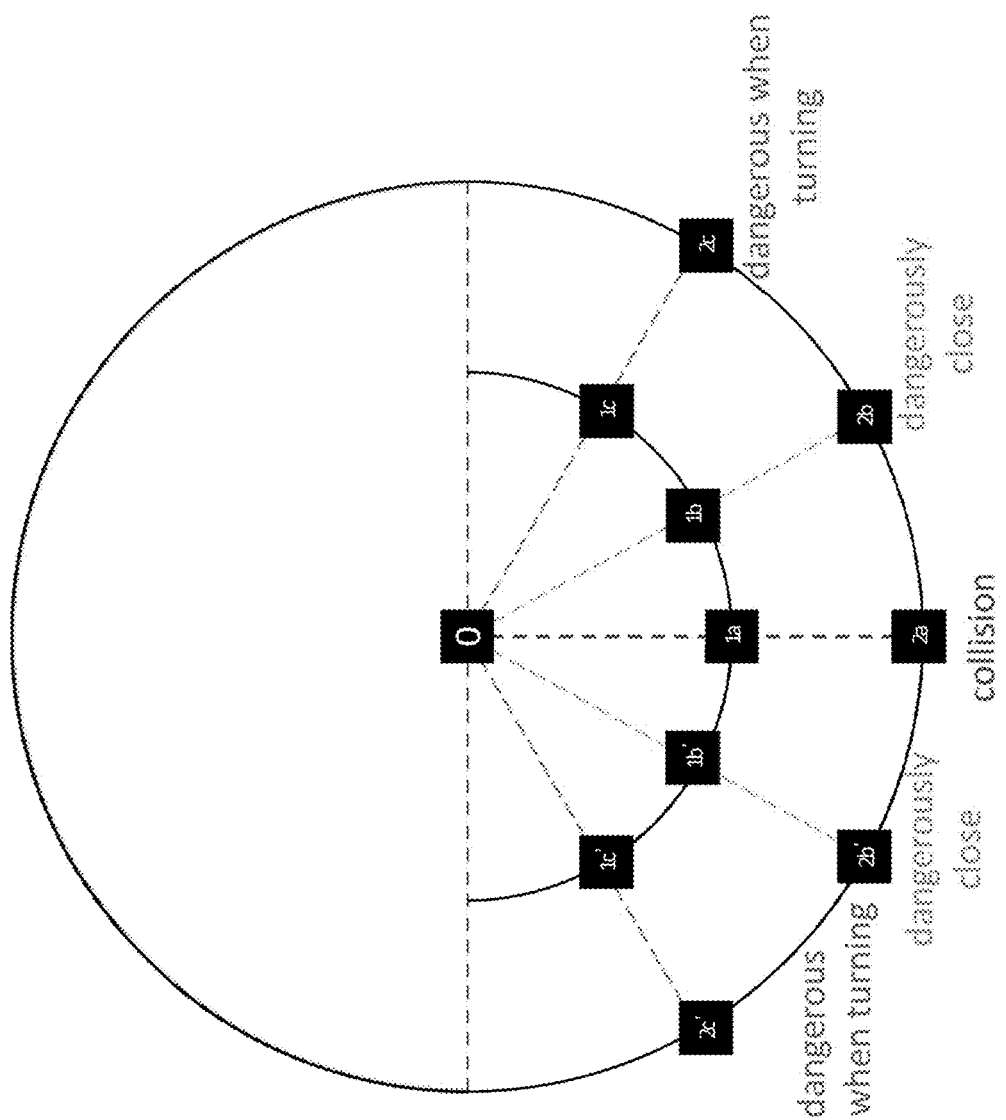
FIG. 4B2

ASSISTING VISUAL MOTION PERCEPTION IN THE EXTREME PERIPHERY

CROSS-REFERENCE TO RELATED APPLICATIONS

This application claims the benefit of priority to U.S. Provisional Patent Application No. 62/826,540, filed Mar. 29, 2019, U.S. Provisional Patent Application No. 62/879,971, filed Jul. 29, 2019, and U.S. Provisional Patent Application No. 62/880,557, filed Jul. 30, 2019; the content of each of which is incorporated herein by reference in its entirety.

BACKGROUND

Field

This disclosure relates to relates generally to the field of assisting visual motion perception, and more particularly to assisting visual motion perception in the periphery, such as the far periphery and the extreme periphery.

Background

Concurrent auditory stimuli can bias visual motion perception in the periphery more than in the fovea. Auditory becomes crucial when reliability of vision is reduced. Detecting extreme-peripheral visual motion from behind may be important because visual ambiguity is very high and detecting such motion can be ecologically critical.

SUMMARY

Disclosed herein include embodiments of a system for improving visual motion perception. In some embodiments, the system comprises: non-transitory memory configured to store executable instructions; an audio output device; a hardware processor (or a processor, such as a virtual processor) in communication with the non-transitory memory, the image capture device, and the audio output device. The hardware processor programmed by the executable instructions to: receive a plurality of images captured by an image capture device. The processor can be programmed by the executable instructions to: determine a location and a trajectory of an object with respect to a user at a first time using the plurality of images. The location and the trajectory of the object with respect to the user at the first time can indicate the object has a likelihood above a likelihood threshold to pass by the user at a passing-by time. The object may not be in a visual field of the user or may be in a far periphery of the visual field of the user at the first time and/or the passing-by time. The processor can be programmed by the executable instructions to: determine an auditory stimulus and an output time to output the auditory stimulus based on the location and the trajectory of the object with respect to the user at the first time. The output time can be the passing-by time, or the output time can be between the first time and the passing-by time. A characteristic of the auditory stimulus can be selected from a group comprising a falling pitch. The processor can be programmed by the executable instructions to: cause the audio output device to output the auditory stimulus to the user at the output time. A likelihood of the user to visually perceive the object in the far periphery of the visual field of the user at the output time or a time immediately after the output time can increase as a result of the auditory stimulus being outputted to the user at the output time.

Disclosed herein include embodiments of a system for improving visual motion perception. In some embodiments, the system comprises: non-transitory memory configured to store executable instructions; an audio output device; and a hardware processor (or a processor, such as a virtual processor) in communication with the non-transitory memory, the image capture device, and the audio output device. The hardware processor can be programmed by the executable instructions to: receive a plurality of images captured by an image capture device. The processor can be programmed by the executable instructions to: determine an object is passing by, or has a likelihood above a likelihood threshold to pass by, the user at a passing-by time using the plurality of images. The object may not be in a visual field of the user or may be in a far periphery of the visual field of the user at the passing-by time. The processor can be programmed by the executable instructions to: determine an auditory stimulus with a characteristic selected from a group comprising a falling pitch. The processor can be programmed by the executable instructions to: cause the audio output device to output the auditory stimulus to the user at an output time. A likelihood of the user to visually perceive the object in the far periphery of the visual field of the user at the output time or a time immediately after the output time can increase as a result of the auditory stimulus being outputted to the user at the output time.

In some embodiments, to receive the plurality of images, the hardware processor is programmed by the executable instructions to: receive sensory data comprising the plurality of images captured by one or more sensors. The one or more sensors can comprise the image capture device, a Radio Detection and Ranging (Radar), a Light Detection and Ranging (Lidar), an audio capture device, or a combination thereof. To determine the location and the trajectory of the object with respect to the user at the first time, the hardware processor can be programmed by the executable instructions to: determine the location and the trajectory of the object with respect to the user at the first time using the sensor data. To determine the object is passing by, or has the likelihood above the likelihood threshold to pass by, the user at the passing-by time, the hardware processor can programmed by the executable instructions to: determine the object is passing by, or has the likelihood above the likelihood threshold to pass by, the user at the passing-by time using the sensor data.

In some embodiments, the system comprises the one or more sensors or one or more of the one or more sensors. The system can comprise the image capture device. In some embodiments, to receive the sensor data, the hardware processor is programmed by the executable instructions to: receive the sensor data captured by the one or more sensors from a second system. In some embodiments, the hardware processor is programmed by the executable instructions to: transmit the sensor data, the location and the trajectory of the object with respect to the user at the first time, and/or an indication that the object is passing by, or has the likelihood above the likelihood threshold to pass by, the user at the passing-by time to a third system. In some embodiments, a helmet, a car audio system, or a wearable speaker system or device, is associated with, comprises, or comprised in, the system, or a portion thereof.

In some embodiments, the object is a first motor vehicle. The user can be in a second motor vehicle or can be riding the second motor vehicle. In some embodiments, the object is in an extreme periphery of the visual field of the user at the first time. In some embodiments, the far periphery of the visual field of the user comprises about 60° to about 110° temporally away from a nose and towards a temple of the user. The extreme periphery of the visual field of the user can comprise about 90° to 110° temporally away from the nose and towards the temple of the user.

In some embodiments, the hardware processor is programmed by the executable instructions to: determine the object has the likelihood above the likelihood threshold to pass by the user at a passing-by time based on the location and the trajectory of the object with respect to the user at the first time. In some embodiments, the likelihood threshold of to the object to pass by the user at the passing-by time is at least 50%, 60%, 70%, 80%, 90%, 95%, or 99%. In some embodiments, the location and the trajectory of the object with respect to the user at the first time indicate the object has the likelihood above the likelihood threshold to pass by the user at the passing-by time within at most 1 meter, 2 meters, 5 meters, or 10 meters, of the user.

In some embodiments, the characteristic of the auditory stimulus is selected from a group comprising a falling pitch, increasing loudness, a higher number of frequencies, a higher frequency, a regularity in angular difference, a peculiarity in angular difference, a sound shadow, a larger angular size, a loudness asymmetry for ears of the user, a head related transfer function of about 90°, a vertical location below a horizon of the user, or a combination thereof. In some embodiments, a change in the characteristic of the auditory stimulus is at a fastest or highest at, or at about, the passing-by time. In some embodiments, the auditory stimulus comprises a narrow range of frequencies or a pure tone. In some embodiments, the auditory stimulus comprises music, speech, or a combination thereof.

In some embodiments, the first time is a time the plurality of images, or a portion thereof, is captured. The first time can be a time after the plurality of images, or a portion thereof, is captured. The first time can be a time immediately after the plurality of images, or a portion thereof, is captured. In some embodiments, the output time is the passing-by time. The output time can be immediately prior to the passing-by time. The output time can be between the first time and the passing-by time.

In some embodiments, the location and the trajectory of the object with respect to the user indicate the object is likely to pass by the user on a left side or a right side of the user at the passing-by time. The audio output device can comprise a left audio output device and a right audio output device configured to output the auditory stimulus to a left ear and a right ear of the user, respectively. To cause the audio output device to output the auditory stimulus to the user at the output time, the hardware processor can be programmed by the executable instructions to: cause the left audio output device or the right audio output device to output the auditory stimulus to the left ear or the right ear of the user, respectively, at the output time.

In some embodiments, the auditory stimulus being outputted to the user at the output time can result in the likelihood of the user to visually perceive the object in the far periphery of the visual field of the user at the output time or the time immediately after the output time to increase by at least 10%, 20%, 30%, 40%, or 50%.

Disclosed herein includes embodiments of a method for improving visual motion perception. In some embodiments, the method is under control of a hardware processor (or a processor, such as a virtual processor) and comprises: receiving sensor data captured by one or more sensors. The method can comprise: determining a location and a trajectory of an object with respect to a subject at a first time using the sensor data. The location and the trajectory of the object with respect to the subject at the first time can indicate the object has a likelihood above a likelihood threshold to be moving relative to the subject within a threshold distance of the subject at a second time. The object may not be in a visual field of the subject or may be in a periphery of the visual field of the subject at the first time. The method can comprise: determining an auditory stimulus based on the location and the trajectory of the object with respect to the subject at the first time. A characteristic of the auditory stimulus can correspond to an auditory characteristic of the object moving relative to the subject within the threshold distance of the subject. The method can comprise: causing the auditory stimulus to be outputted to the subject at an output time. The method can result in a likelihood of the subject to visually perceive the object in the periphery of the visual field of the subject at the output time or a time immediately after the output time to increase.

Disclosed herein include embodiments of a method for improving visual motion perception. In some embodiments, the method is under control of a hardware processor (or a processor, such as a virtual processor) and comprises: receiving sensor data captured by one or more sensors. The method can comprise: determining an object is, or has a likelihood above a likelihood threshold, to be moving relative to a subject within a threshold distance of the subject using the sensor data. The method can comprise: determining an auditory stimulus with a characteristic that corresponds to an auditory characteristic of the object moving relative to the subject within the threshold distance of the subject. The method can comprise: causing the auditory stimulus to be outputted to the subject at an output time. The method can result in a likelihood of the subject to visually perceive the object in the periphery of the visual field of the subject at the output time or a time immediately after the output time to increase.

In some embodiments, the one or more sensors comprise an image capture device, a Radio Detection and Ranging (Radar), a Light Detection and Ranging (Lidar), an audio capture device, or a combination thereof. In some embodiments, the sensor data comprises a location, a speed, and a direction of the object captured by one or more telemetry and location sensors associated with the object. The one or more sensors can comprise the one or more telemetry and location sensors associated with the object. In some embodiments, the sensor data comprises a location, a speed, and a direction of the object captured by one or more telemetry and location sensors associated with the subject. The one or more sensors can comprise the one or more telemetry and location sensors associated with the subject. The one or more telemetry and location sensors associated with the object can comprise a global positioning system (GPS) sensor associated with the object. The one or more telemetry and location sensors associated with the subject can comprise a global positioning system (GPS) sensor associated with the subject.

In some embodiments, a helmet, a car audio system, or a wearable speaker system or device, is associated with, comprises, or comprised in, the one or more sensors. Causing the auditory stimulus to be outputted can comprise causing an audio output device of the helmet, the car audio system, or the wearable speaker system or device, to output the auditory stimulus at the output time.

In some embodiments, the object is a first motor vehicle. In some embodiments, the subject is in a second motor vehicle or is riding the second motor vehicle. In some embodiments, the object is in a far periphery, or extreme periphery, of the visual field of the subject at the first time and/or the second time. In some embodiments, the far periphery of the visual field of the user comprises about 60° to about 110° temporally away from a nose and towards a temple of the subject. The extreme periphery of the visual field of the user can comprise about 90° to 110° temporally away from the nose and towards the temple of the subject.

In some embodiments, the method comprises: determining the object has the likelihood above the likelihood threshold to be moving relative to the subject within the threshold distance of the subject at the second time based on the location and the trajectory of the object with respect to the subject at the first time. In some embodiments, the location and the trajectory of the object with respect to the subject at the first time can indicate the object has a high likelihood to pass by, or to impact, the subject at the second time. In some embodiments, the location and the trajectory of the object with respect to the subject indicate the object is likely to pass by, or impact, the subject on a left side or a right side of the subject at the second time. Causing the auditory stimulus to be outputted to the subject at the output time can comprise causing the auditory stimulus to be outputted to a left ear or a right ear, respectively, of the subject at the output time.

In some embodiments, the likelihood threshold of the object to be moving relative to the subject within the threshold distance of the subject at the second time is at least 50%, 60%, 70%, 80%, 90%, 95%, or 99%. In some embodiments, the threshold distance is at most 0 meter, 1 meter, 2 meters, 5 meters, or 10 meters.

In some embodiments, the characteristic of the auditory stimulus is a falling pitch. In some embodiments, the characteristic of the auditory stimulus is selected from a group comprising a falling pitch, increasing loudness, a higher number of frequencies, a higher frequency, a regularity in angular difference, a peculiarity in angular difference, a sound shadow, a larger angular size, a loudness asymmetry for ears of the subject, a head related transfer function of about 90°, a vertical location below a horizon of the subject, or a combination thereof. In some embodiments, a change in the characteristic of the auditory stimulus is at a fastest or highest at, or at about, the passing-by time. In some embodiments, the auditory stimulus comprises a narrow range of frequencies or a pure tone. In some embodiments, the auditory stimulus comprises music, speech, or a combination thereof. In some embodiments, determining the auditory stimulus comprises determining the auditory stimulus and the output time based on the location and the trajectory of the object with respect to the subject at the first time.

In some embodiments, the first time is a time the sensor data, or a portion thereof, is captured. The first time can be a time after the sensor data, or a portion thereof, is captured. The first time can be a time immediately after the sensor data, or a portion thereof, is captured. In some embodiments, the output time is the second time. The output time can be immediately prior to the second time. The output time can be between the first time and the second time.

In some embodiments, the method results in the likelihood of the subject to visually perceive the object in the periphery of the visual field of the user at the output time or the time immediately after the output time to increase by at least 10%, 20%, 30%, 40%, or 50%.

Disclosed herein include embodiments of a system for user safety. In some embodiments, the system comprises: non-transitory memory configured to store executable instructions; one or more sensors associated with a helmet, or a wearable device, for capturing different types of sensor data; a plurality of audio output devices for outputting auditory stimuli that mimic sounds from (1a) the horizon and (1b) below the horizon of a user and from (2a) the left side of, (2b) directly behind, and (2c) the right side of the user; and a hardware processor in communication with the non-transitory memory. The hardware processor can be programmed by the executable instructions to: receive first sensor data captured by the one or more sensors. The hardware processor can be programmed by the executable instructions to: determine a first location of an object with respect to the user at a first time using the first sensor data. The first location of the object with respect to the user can be within a first threshold distance of the user. The hardware processor can be programmed by the executable instructions to: determine one or more first auditory stimuli and corresponding one or more first audio output devices of the plurality of output devices for outputting the one or more first auditory stimuli using the first location of the object with respect to the user at the first time. A characteristic of the first auditory stimulus can be related to a property of the object. The hardware processor can be programmed by the executable instructions to: cause each of the one or more first audio output devices to output the corresponding first auditory stimulus of the one or more first auditory stimuli.

In some embodiments, the characteristic of the first auditory stimulus is a pitch of the first auditory stimulus, wherein the characteristic of the first auditory stimulus is related to the property of the object comprising a size of the object, and wherein the pitch of the first auditory stimulus correlates positively, or negatively, with the size of the object. In some embodiments, the characteristic of the first auditory stimulus is a loudness of the first auditory stimulus, wherein the characteristic of the first auditory stimulus is related to the property of the object comprising a speed of the object, and wherein the loudness of the first auditory stimulus correlates positively, or negatively, with the speed of the object. In some embodiments, the characteristic of the first auditory stimulus is a pitch of the first auditory stimulus, wherein the characteristic of the first auditory stimulus is related to the property of the object comprising a size and/or a speed of the object, wherein the pitch of the first auditory stimulus correlates positively, or negatively, with the size of the object, and wherein the pitch of the first auditory stimulus correlates positively, or negatively, with the speed of the object.

In some embodiments, the one or more first auditory stimuli and the corresponding one or more first audio output devices comprise two or more first auditory stimuli and corresponding two or more first audio output devices. A combination of the two or more first auditory stimuli outputted by the corresponding first audio output devices can mimic a sound of the object moving at the first location with respect to the user at the first time that none of the plurality of audio output devices individually is capable of mimicking. In some embodiments, the one or more first auditory stimuli comprise a narrow range of frequencies or a pure tone. In some embodiments, the one or more first auditory stimuli comprises music, speech, or a combination thereof.

In some embodiments, the hardware processor is programmed by the executable instructions to: receive second sensor data captured by the one or more sensors. The hardware processor can be programmed by the executable instructions to: determine a second location of the object with respect to the user at a second time using the second sensor data. The second location of the object with respect to the user can be within a second threshold distance of the user, wherein the second threshold distance is shorter, or longer, than the first threshold distance. The hardware processor can be programmed by the executable instructions to: determine one or more second auditory stimuli and corresponding one or more second audio output devices of the plurality of output devices for outputting the one or more second auditory stimuli using the second location of the object with respect to the user at the second time. A characteristic of the second auditory stimulus can be related to the property of the object. A difference between a characteristic of the second auditory stimulus relative to the characteristic of the first auditory stimulus can be related to the second location of the object with respect to the user at the second time. The hardware processor can be programmed by the executable instructions to: cause each of the one or more second audio output devices to output the corresponding second auditory stimulus of the one or more second auditory stimuli.

In some embodiments, the difference between the characteristic of the second auditory stimulus relative to the characteristic of the first auditory stimulus is a higher, or a lower, number of frequencies. In some embodiments, the difference between the characteristic of the second auditory stimulus relative to the characteristic of the first auditory stimulus is greater loudness or lower loudness.

In some embodiments, the hardware processor is programmed by the executable instructions to: receive third sensor data captured by the one or more sensors. The hardware processor can be programmed by the executable instructions to: determine a third location of the object with respect to the user at a third time using the third sensor data. The third location of the object with respect to the user can be within a third threshold distance of the user. The third threshold distance can be shorter, or longer, than the second threshold distance. The hardware processor can be programmed by the executable instructions to: determine (i) the one or more first auditory stimuli and the corresponding one or more first audio output devices of the plurality of output devices for outputting the one or more first auditory stimuli and (ii) the one or more second auditory stimuli and the corresponding one or more second audio output devices of the plurality of output devices for outputting the one or more second auditory stimuli using the third location of the object with respect to the user at the third time. The hardware processor can be programmed by the executable instructions to: cause each of the one or more first and second audio output devices to output the corresponding first or second auditory stimulus of the one or more first and second auditory stimuli.

In some embodiments, the system is associated with, comprises, or is comprised in a helmet or a wearable device, optionally wherein the plurality of audio output devices is on, in, or within, the helmet or the wearable device. The plurality of audio output devices can be positioned for outputting auditory stimuli that mimic sounds from (1a) the horizon and (1b) below the horizon of the user and from (2a) the left side of, (2b) directly behind, and (2c) the right side of the user.

In some embodiments, the plurality of audio output devices comprises: (i) a horizon-level audio output device for outputting auditory stimuli that mimic sounds from a center point of the horizon of a user when wearing the helmet or the wearable device, and (ii) a first left below-horizon audio output device and a first right below-horizon audio output device of a first contour on, or of, the helmet or the wearable device for outputting auditory stimuli that mimic sounds from a first vertical level below the horizon of the user on a left side and a right side of the user, respectively, when wearing the helmet or the wearable device. The plurality of audio output devices can comprise a center below-horizon audio output device of the first contour for outputting auditory stimuli that mimic sounds from below the horizon and the center point of the user.

In some embodiments, the plurality of audio output devices comprises (iii) a first left below-horizon audio output device and a first right below-horizon audio output device of a second contour on, or of, the helmet or wearable device for outputting auditory stimuli that mimic sounds from a second vertical level below the horizon of the user on a left side and a right side of the user, respectively, when wearing the helmet or the wearable device. The second vertical level can be below the first vertical level. The second contour can be below the first contour.

In some embodiments, the plurality of audio output devices comprises (ii) a second left below-horizon audio output device and a second right below-horizon audio output device of the first contour on, or of, the helmet or the wearable device for outputting auditory stimuli that mimic sounds from the first vertical level below the horizon of the user, respectively, when wearing the helmet or the wearable device. The sounds mimicked by the auditory stimuli outputted by the second left below-horizon audio output device can be to a left of the sounds mimicked by the auditory stimuli outputted by the first left below-horizon audio output device of the first contour. The sounds mimicked by the auditory stimuli outputted by the second right below-horizon audio output device can be to a right of the sounds mimicked by the auditory stimuli outputted by the first right below-horizon audio output device of the first contour. The second left below-horizon audio output device can be to a left of the first left below-horizon audio output device of the first contour. The second right below-horizon audio output device can be to a right of the first right below-horizon audio output device of the first contour.

In some embodiments, the hardware processor is programmed by the executable instructions to: receive fourth sensor data captured by the one or more sensors. The hardware processor can be programmed by the executable instructions to: determine the object is passing by, or has a likelihood above a likelihood threshold to pass by, the user at a passing-by time using the fourth sensor data, wherein the object may not be in a visual field of the user or may be in a far periphery of the visual field of the user at the passing-by time. The hardware processor can be programmed by the executable instructions to: determine a fourth auditory stimulus with a characteristic that corresponds to an auditory characteristic of the object passing by the user. The hardware processor can be programmed by the executable instructions to: cause one or more of the plurality of audio output devices to output the fourth auditory stimulus to the user at an output time. The fourth auditory stimulus being outputted to the user at the output time can result in a likelihood of the user to visually perceive the object in the far periphery of the visual field of the user at the output time or a time immediately after the output time to increase.

In some embodiments, the one or more sensors comprises an image capture device, a Radio Detection and Ranging (Radar), a Light Detection and Ranging (Lidar), an audio capture device, or a combination thereof.

In some embodiments, the object is a first motor vehicle. In some embodiments, the user is in a second motor vehicle or is riding the second motor vehicle. In some embodiments, the object is in an extreme periphery of the visual field of the user at the passing-by time. The far periphery of the visual field of the user can comprise about 60° to about 110° temporally away from a nose and towards a temple of the user. The extreme periphery of the visual field of the user can comprise about 90° to 110° temporally away from the nose and towards the temple of the user.

In some embodiments, the likelihood threshold of to the object to pass by the user at the passing-by time is at least 50%, 60%, 70%, 80%, 90%, 95%, or 99%. In some embodiments, the object is passing by, or has the likelihood above the likelihood threshold to pass by, the user at the passing-by time within at most 1 meter, 2 meters, 5 meters, or 10 meters, of the user.

In some embodiments, the characteristic of the fourth auditory stimulus is selected from a group comprising a falling pitch, increasing loudness, a higher number of frequencies, a higher frequency, a regularity in angular difference, a peculiarity in angular difference, a sound shadow, a larger angular size, a loudness asymmetry for ears of the user, a head related transfer function of about 90°, a vertical location below a horizon of the user, or a combination thereof. In some embodiments, a change in the characteristic of the fourth auditory stimulus is at a fastest or highest at, or at about, the passing-by time.

In some embodiments, the passing-by time is a time the fourth sensor data, or a portion thereof, is captured. The passing-by time can be a time after the fourth sensor data, or a portion thereof, is captured. The passing-by time can be a time immediately after the fourth sensor data, or a portion thereof, is captured In some embodiments, the object is passing by, or is likely to pass by, the user on the left side, or the right side, of the user. To cause the one or more of the plurality of audio output devices to output the fourth auditory stimulus to the user at the output time, the hardware processor can be programmed by the executable instructions to: cause the first left below-horizon audio output device, or the first right below-horizon audio output device, of the first contour and/or the first left below-horizon audio output device, or the first right below-horizon audio output device, of the second contour to output the fourth auditory stimulus at the output time.

In some embodiments, the fourth auditory stimulus being outputted to the user at the output time can result in the likelihood of the user to visually perceive the object in the far periphery of the visual field of the user at the output time or the time immediately after the output time to increase by at least 10%, 20%, 30%, 40%, or 50%.

Disclosed herein includes embodiments of a computer readable medium comprising executable instructions, when executed by a hardware processor of a computing system or device, cause the hardware processor, or the computing system or device, to perform any of the methods disclosed herein.

Details of one or more implementations of the subject matter described in this specification are set forth in the accompanying drawings and the description below. Other features, aspects, and advantages will become apparent from the description, the drawings, and the claims. Neither this summary n or the following detailed description purports to define or limit the scope of the inventive subject matter.

BRIEF DESCRIPTION OF THE DRAWINGS

FIGS. 3A-3D are schematic illustrations showing non-limiting exemplary placements of auditory output devices of a system (e.g., speakers of a smart helmet or wearable device) for enhancing visual motion perception in the far periphery and extreme periphery.

FIGS. 4A-4F are schematic illustrations showing non-limiting exemplary activations of auditory output devices of a system (e.g., speakers of a smart helmet or wearable device) for enhancing visual motion perception in the far periphery and extreme periphery.

DETAILED DESCRIPTION

Figure 1:
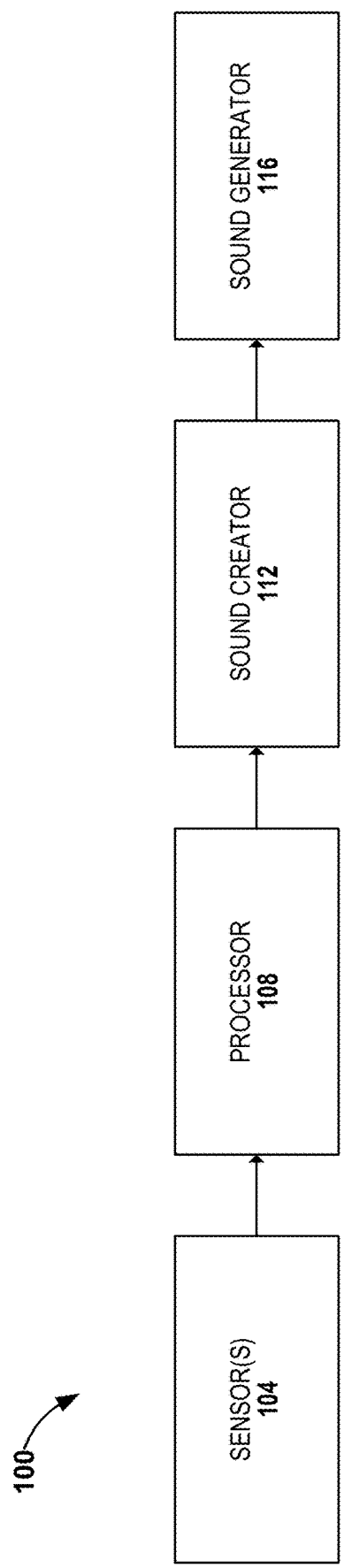
FIG. 1 is a block diagram of a non-limiting exemplary system for enhancing visual motion perception in the far periphery and extreme periphery.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein and made part of the disclosure herein.

Disclosed herein include embodiments of a system for improving visual motion perception. In some embodiments, the system comprises: non-transitory memory configured to store executable instructions; an audio output device; a hardware processor (or a processor, such as a virtual processor) in communication with the non-transitory memory, the image capture device, and the audio output device. The hardware processor programmed by the executable instructions to: receive a plurality of images captured by an image capture device. The processor can be programmed by the executable instructions to: determine a location and a trajectory of an object with respect to a user at a first time using the plurality of images. The location and the trajectory of the object with respect to the user at the first time can indicate the object has a likelihood above a likelihood threshold to pass by the user at a passing-by time. The object may not be in a visual field of the user or may be in a far periphery of the visual field of the user at the first time. The processor can be programmed by the executable instructions to: determine an auditory stimulus and an output time to output the auditory stimulus based on the location and the trajectory of the object with respect to the user at the first time. The output time can be the passing-by time, or the output time can be between the first time and the passing-by time. A characteristic of the auditory stimulus can be selected from a group comprising a falling pitch. The processor can be programmed by the executable instructions to: cause the audio output device to output the auditory stimulus to the user at the output time. A likelihood of the user to visually perceive the object in the far periphery of the visual field of the user at the output time or a time immediately after the output time can increase as a result of the auditory stimulus being outputted to the user at the output time.

Disclosed herein include embodiments of a system for improving visual motion perception. In some embodiments, the system comprises: non-transitory memory configured to store executable instructions; an audio output device; and a hardware processor (or a processor, such as a virtual processor) in communication with the non-transitory memory, the image capture device, and the audio output device. The hardware processor can be programmed by the executable instructions to: receive a plurality of images captured by an image capture device. The processor can be programmed by the executable instructions to: determine an object is passing by, or has a likelihood above a likelihood threshold to pass by, the user at a passing-by time using the plurality of images. The object may not be in a visual field of the user or may be in a far periphery of the visual field of the user at the first time. The processor can be programmed by the executable instructions to: determine an auditory stimulus with a characteristic selected from a group comprising a falling pitch. The processor can be programmed by the executable instructions to: cause the audio output device to output the auditory stimulus to the user at an output time. A likelihood of the user to visually perceive the object in the far periphery of the visual field of the user at the output time or a time immediately after the output time can increase as a result of the auditory stimulus being outputted to the user at the output time.

Disclosed herein includes embodiments of a method for improving visual motion perception. In some embodiments, the method is under control of a hardware processor (or a processor, such as a virtual processor) and comprises: receiving sensor data captured by one or more sensors. The method can comprise: determining a location and a trajectory of an object with respect to a subject at a first time using the sensor data. The location and the trajectory of the object with respect to the subject at the first time can indicate the object has a likelihood above a likelihood threshold to be moving relative to the subject within a threshold distance of the subject at a second time. The object may not be in a visual field of the subject or may be in a periphery of the visual field of the subject at the first time. The method can comprise: determining an auditory stimulus based on the location and the trajectory of the object with respect to the subject at the first time. A characteristic of the auditory stimulus can correspond to an auditory characteristic of the object moving relative to the subject within the threshold distance of the subject. The method can comprise: causing the auditory stimulus to be outputted to the subject at an output time. The method can result in a likelihood of the subject to visually perceive the object in the periphery of the visual field of the subject at the output time or a time immediately after the output time to increase.

Disclosed herein include embodiments of a method for improving visual motion perception. In some embodiments, the method is under control of a hardware processor and comprises: receiving sensor data captured by one or more sensors. The method can comprise: determining an object is, or has a likelihood above a likelihood threshold, to be moving relative to a subject within a threshold distance of the subject using the sensor data. The object may not be in a visual field of the subject or may be in a periphery of the visual field of the subject at the first time. The method can comprise: determining an auditory stimulus with a characteristic that corresponds to an auditory characteristic of the object moving relative to the subject within the threshold distance of the subject. The method can comprise: causing the auditory stimulus to be outputted to the subject at an output time. The method can result in a likelihood of the subject to visually perceive the object in the periphery of the visual field of the subject at the output time or a time immediately after the output time to increase.

Disclosed herein include embodiments of a system for user safety. In some embodiments, the system comprises: non-transitory memory configured to store executable instructions; one or more sensors associated with a helmet, or a wearable device, for capturing different types of sensor data; a plurality of audio output devices for outputting auditory stimuli that mimic sounds from (1a) the horizon and (1b) below the horizon of a user and from (2a) the left side of, (2b) directly behind, and (2c) the right side of the user; and a hardware processor (or a processor, such as a virtual processor) in communication with the non-transitory memory. The hardware processor can be programmed by the executable instructions to: receive first sensor data captured by the one or more sensors. The hardware processor can be programmed by the executable instructions to: determine a first location of an object with respect to the user at a first time using the first sensor data. The first location of the object with respect to the user can be within a first threshold distance of the user. The hardware processor can be programmed by the executable instructions to: determine one or more first auditory stimuli and corresponding one or more first audio output devices of the plurality of output devices for outputting the one or more first auditory stimuli using the first location of the object with respect to the user at the first time. A characteristic of the first auditory stimulus can be related to a property of the object. The hardware processor can be programmed by the executable instructions to: cause each of the one or more first audio output devices to output the corresponding first auditory stimulus of the one or more first auditory stimuli.

Throughout the drawings, reference numbers may be re-used to indicate correspondence between referenced elements. The drawings are provided to illustrate example embodiments described herein and are not intended to limit the scope of the disclosure.

Enhancing Visual Motion Perception

Human visual perception is most accurate and sensitive at the fovea (~2 degrees) of an eye, and the performance gradually degrades through para-fovea (~5 degrees) and periphery (~40 degrees). As such, a person needs to direct his or her head and/or gaze toward a moving object (even if the motion of the object is relative and caused by the perceiver's motion) in one's extreme periphery (60-100 degrees) in order to capture the object in the fovea. Visually perceiving moving objects in the extreme periphery can be crucial in a person's daily life, such as when driving a car. Many technologies, such as rear mirrors, side mirrors, rear monitors, blind spot alert systems in side mirrors, or digital mirrors, have been developed for seeing moving objects that otherwise would not be captured in the fovea and para-fovea of people's eyes. These technologies fall into one of the two categories: showing the object's image closer to a person's fovea optically (e.g., a mirror) and/or by image processing (e.g., a digital mirror); or, alerting a person to direct his or her gaze towards the object (e.g., a blind spot alert system). The existing technologies require directing a person's gaze toward the object itself and/or its optical image on a device (e.g., a mirror). The existing technologies lead to people driving without looking ahead, which is one of the most common causes of car accidents.

Disclosed herein include systems, devices, computer readable media, and methods for enhancing human visual motion perception in the periphery. Using an auditory cue or stimulus (e.g., a simple auditory cue), a person can perceive moving object in the periphery without directing his or her gaze toward the object. In some embodiments, the person's vision in the far periphery or extreme periphery is enhanced, which can facilitate the subject in performing tasks such as driving a car or riding a motorcycle. The auditory cue or stimulus can enable a human to perceive a moving object in the far periphery and extreme periphery without directing the person's gaze toward the object. The enhanced perception can improve safety in the person's daily life, such as when he or she is driving a car. A person's visual perception of one or more moving objects in the far periphery and extreme periphery can be activated or improved by presenting a sound to the person while manipulating one or more of factors disclosed herein. Presenting sounds without manipulating any of those factors can actually impair visual perception in the far periphery and extreme periphery.

Auditory Stimuli, Presentations, and Cues

An ecologically appropriate auditory stimulus, presentation, or cue corresponding to the motion in the far periphery or extreme periphery, which is roughly 90 degrees to the side when a person is facing forward, can facilitate visual motion perception in the far periphery or extreme periphery. Auditory stimuli with one or more of the properties or characteristics can make the far visual periphery or extreme periphery more salient than the stimuli's non-ecological counterparts.

(a) Pitch—
The pitch is falling (not rising).

(a') The pitch is not only falling, but is falling at the fastest rate in its course. Consider a sigmoid function of the rate of the pitch changing vs. time. When the function is falling at the fastest rate (i.e., the pitch is falling at the fastest rate), a person's brain knows that a moving car (or a moving object, such as a moving motorcycle, or a moving truck) is at 90 degrees of the person's field of view and may be physically nearest to the person.

(b) Loudness—
The sound is loud, because the corresponding source is near. The sound can be loud enough to even vibrate the body (which can be considered as a generalization of the auditory sense).

(b') The loudness is not only high, but is at its peak. The loudness can be represented as an inverted U-shaped function. As the loudness levels off, a person's brain knows the object is nearing the periphery.

(c) Range of Frequencies—
When a noise-making object is close, a person can hear a fuller range of its emitted frequencies, especially more of the high frequency components. When a noise-making object is far away, a person can hear more of the low-frequency components.

(c') The derivative variant of (c).

(d) Regularities in Angular Differences—
There are regularities for what a moving object sounds like in front of, behind, or to the side, of a person, even if the person is moving with zero velocity relative to the object.

A moving object (e.g., a car) is propelling itself and makes noise. Dirt, for example, is being kicked behind, not in front. Humans are sensitive to the noise or sound made.

Movers usually have a "heel-toe" sequence for each step or footstep that is literal, rather than running on point-sized tips. For an object with tires, there's also a heel-toe sequence in the sense that the tire is constant rotating onto new "toes" which become heels as the tire rotates. A heel-toe sequence sounds different when in front of a person, compared to when behind the person, even when the person is moving at zero speed relative to the object. For example, when in front, the heel-toe sound is more coincidental in timing (e.g., having a higher frequency), whereas when behind the sound of heel-toe has a greater time gap (e.g., having a lower frequency).

(d') The derivative variant of (d).

(e) Peculiarities in Angular Differences—
Real noise-making moving objects do not sound the same in front of a person, behind the person, and at the side of the person for less generalizable reasons than in (d). Consider a person is driving in front of a car (at the same speed), versus behind the car, versus at the side of the car, all at equidistance. There are differences between the sounds heard by the person. The person may hear more motor sounds when driving in front of the car (assuming the car has a front engine), more exhaust and carburetor sounds when driving behind the car. The differences in sounds depend a lot on the kind of object making the sound (e.g., a car), which humans learn.

(e') The derivative variant of (e).

(f) Sound Shadows—
Objects partially block the sounds from the things behind them in the environment. So, even a very quietly moving object has a moving "sound shadow" partially blocking ambient environmental sounds behind the object. Rather than a moving sound, a moving object may be associated with moving quieting, or have a moving sound shadow, which humans can perceive.

(g) Larger Angular Size—
Moving, sound-making objects are not point-sized. Such objects have finite sizes, and when close, the objects make sounds coming from multiple directions. For example, when a train is far away, the train is a point sound source. But when next to you, the brain can be making sounds over almost 180 degrees of angle. In fact, almost a half hemisphere of angle, including above and below the horizon. A nearer object can have more of a "surround-sound."

(g') The derivative variant of (g).

(h) Ear Asymmetry—
The nearer a moving object is to pass a person, the greater the loudness asymmetry for the ears of the person.

(h') The derivative variant of (h).

(i) Head Related Transfer Function (HRTF)—
The nearer a moving object is to pass a person, the more the HRTF indicates the object is at 90 degrees to the person.

(i') The derivative variant of (i).

(k) Vertical Location—
The strongest auditory cue for a moving creature can emanate directionally from well below the horizon, from the moving creature's feet upon the ground. So, a nearby creature in a person's periphery might go from 70 degrees below the horizon to 40 degrees above the horizon—and this 110 degrees total vertical extent—yet its sound disproportionately tend to emanate just from the bottom, at −70 degrees. An auditory cue at −70 degrees does not necessarily mean an object is at −70 degrees. Instead, the auditory cue at −70 degrees can indicate an entire moving creature whose feet (or wheels for a moving vehicle) happen to be down there, even though most of the creature is not even near there. The rest of the creature's body (or the vehicle's body) might be entirely silent. Most animals are actually like this—their joints make zero sound when moving, and all the sounds the animals make come from the animals stepping on the earth below.

(k') One to One Mapping from Height of an Object's Sound in a Person's Perceptual Field to the Distance of the Object from the Person—

Objects can fill up a lot of a person's perceptual field, especially when the objects are nearby the person. Objects can make sounds in lots of different ways, coming from different parts of them. For moving creatures (or moving vehicles) there are some fundamental generalizations: The sound a moving creature makes tend to come from his or her feet upon the ground. From vertical position of the sound made by the moving creature in a person's perceptual field, the distance of the creature to the person can be determined. There is a one-to-one relationship between vertical field position below the horizon and distance. Sounds coming from the horizon are infinitely far away. Sounds that emanate from or perceived by a person to emanate from below his or her perceptual field are closer by. A sound coming from below a person means the creature making the sound is basically walking directly next to the person, at zero distance from the person.

System for Enhancing Visual Motion Perception

FIG. 1 is a block diagram of a non-limiting exemplary system or a device (e.g., a wearable device) 100 for enhancing visual motion perception in the far periphery and extreme periphery. The system can comprise one or more sensors 104, a processor 108, a sound creator 112, and a sound generator 116. The one or more sensors 104 can comprise a Radar, a camera, and a microphone. The one or more sensors 104 can capture sensor data, such as a plurality of images.

The processor 108 can use the sensor data to determine properties and characteristics of a moving object (e.g., an object, such as a vehicle, approaching a subject, such as a user of the system from behind), such as the object's size, the object's distance to the subject, the object's speed, the object's moving direction. The processor 108 can use the sensor data to determine the object's location and possible trajectory. For example, the processor 108 can determine a location and a trajectory of an object with respect to a subject at a first time using the sensor data. The location and the trajectory of the object with respect to the subject at the first time can indicate the object has a likelihood above a likelihood threshold (e.g., 80%) to be moving relative to the subject within a threshold distance (e.g., 5 meters) of the subject at a second time. The object may not be (or is not) in a visual field of the subject or may be (or is) in a periphery of the visual field of the subject at the first time.

The sound creator 112 can translate properties and characteristics of the object into sound stimulus or cue disclosed herein. The sound stimulus or cue does not need to be or imitate real/natural sound from the object (e.g., engine sound). In some embodiments, the sound stimulus or cue can be very simple, artificial sound that simulates or amplify the essence of the sound from moving object (e.g., a simple beep with sudden pitch change). For example, the sound creator 112 can determine an auditory stimulus based on the location and the trajectory of the object with respect to the subject at the first time. A characteristic of the auditory stimulus can correspond to an auditory characteristic of the object moving relative to the subject within the threshold distance of the subject. For example, the auditory stimulus can have a falling pitch which can imitate a Doppler pitch shift.

The sound generator 116 can be an audio device such as a speaker or an earphone. The sound generator 116 can output the sound stimulus or cue determined. For example, the sound generator 116 can output the auditory stimulus to the subject at an output time. The subject's extreme-peripheral visual perception can be enhanced as a result of the sound stimulus or cue outputted by the sound generator 112. A likelihood of the subject to visually perceive the object in the periphery of the visual field of the subject at the output time or a time immediately after (e.g., within 0.0000001 second, 0.000001 second, 0.00001 second, 0.0001 second, 0.001 second, 0.01 second, 0.1 second, or 1 second) the output time to increase.

The system 100, or one or more components of the system 100, can be associated with, can comprise, or can be comprised in, a helmet (e.g., a smart helmet) for a rider of a motorcycle or bicycle, for a driver for a vehicle such as a car or a leisure vehicle, and for an aviation pilot; a vehicle audio system (e.g., a car audio system); and a wearable speaker system for a pedestrian or a wheel chair user.

Characteristics of Auditory Stimuli-Based Visual Motion Perception Enhancement (1) Digital Mirror Device.

A digital mirror device and any method (or system) disclosed herein based on auditory presentations or stimuli aim to help humans to visually perceive moving object(s) in blind spots such as the extreme periphery. The digital mirror device, however, uses image processing, whereas the method disclosed herein uses auditory presentations. The digital mirror device also requires the direction of a person's gaze to move towards a visual image in the device, whereas the method of the present disclosure does not require such gaze direction because the method enables human to directly perceive the object in the extreme periphery and not the fovea.

(2) Rear Object Alert System.

A rear object alert system and any method (or system) disclosed herein based on auditory presentations or stimuli aim to help human to visually perceive moving object(s) in blind spots such as the extreme periphery. A rear object alert system, however, uses auditory and/or visual alerts to have a human directs his or her gaze toward the object, whereas the method disclosed herein uses auditory stimuli to enable a person to perceive object visually without changing his or her gaze direction. The auditory stimuli can have characteristics or properties disclosed herein (e.g., falling pitch), while a simple alerting sound made by a rear object alert system cannot provide visual perception in the extreme periphery (and may even impair visual detection).

(3) Audio-Tactile Direction Indicator.

An audio-tactile direction indicator and any method (or system) disclosed herein based on auditory presentations or stimuli use two modalities to present information. An audio-tactile direction indicator is based on auditory and tactile stimuli. The method disclosed herein is based on and vision and auditory stimuli. An audio-tactile direction indicator aims to provide direction information in a helmet mainly by auditory stimuli, and uses tactile stimuli as an aid. The method disclosed herein aims to enable humans to perceive moving object visually in the extreme periphery by presenting auditory stimuli with one or more characteristics or properties disclosed herein (e.g., falling pitch).

(4) 3D Audio or Stereophonic Technologies.

3D audio or stereophonic technologies and any method (or system) disclosed herein based on auditory presentations or stimuli use sound to allow humans to perceive the outer world more clearly through auditory stimulation. The technologies aim to create more real, ultra-accurate sounds to replicate real ambient sounds. The method of the present disclosure, however, requires only simple sounds, while manipulating one or multiple factors or characteristics disclosed herein, but does not need to create such high-quality sound unlike these technologies. For example, a simple monaural 1000 Hz beep with its pitch decreasing by only 10% and primitive fade-in and fade-out effects in loudness, by means of an inexpensive headphone, can enhance visual motion perception in the far periphery and extreme periphery.

Enhancing Visual Motion Perception

Figure 2:
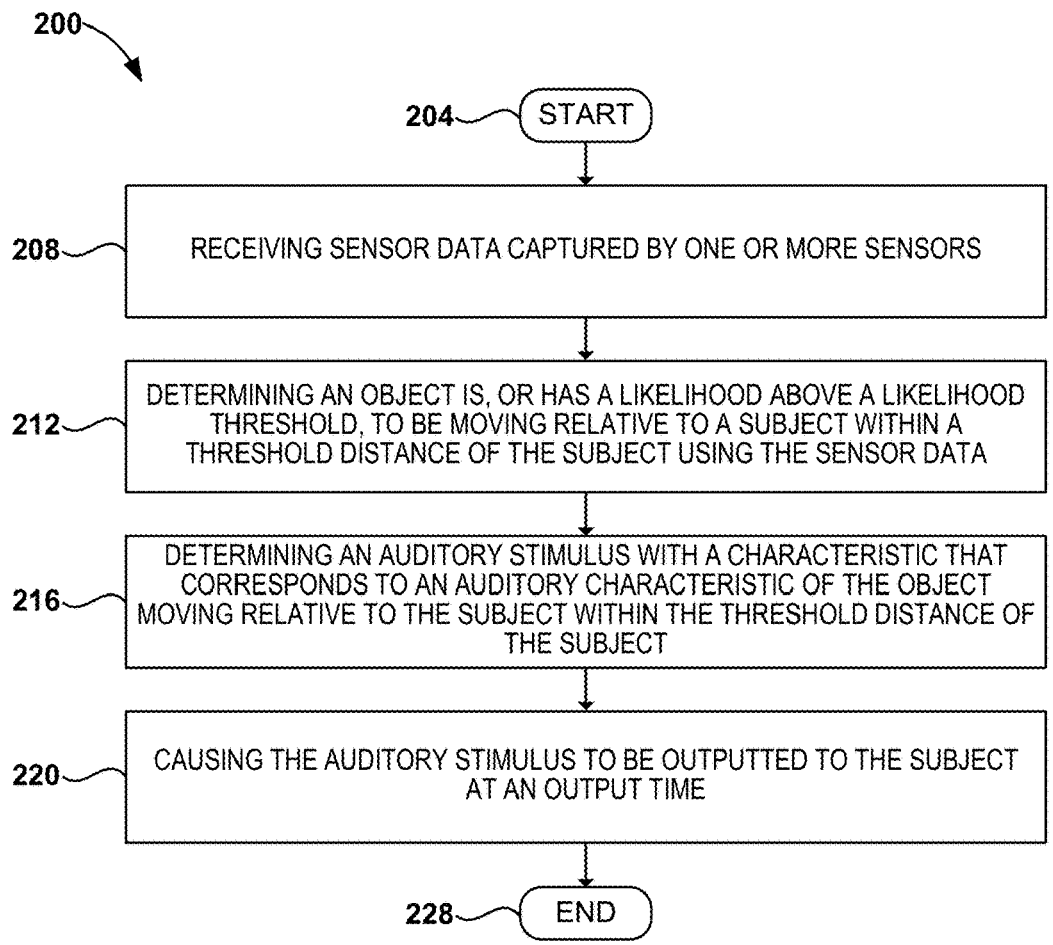
FIG. 2 is a flow diagram showing an exemplary method of enhancing visual motion perception from behind.

FIG. 2 is a flow diagram showing an exemplary method 200 of enhancing or improving visual motion perception from behind. The method 200 may be embodied in a set of executable program instructions stored on a computer-readable medium, such as one or more disk drives, of a computing system or device. For example, the computing system 600 shown in FIG. 6 and described in greater detail below can execute a set of executable program instructions to implement the method 200. When the method 200 is initiated, the executable program instructions can be loaded into memory, such as RAM, and executed by one or more processors of the computing system 600. Although the method 200 is described with respect to the computing system 600 shown in FIG. 6, the description is illustrative only and is not intended to be limiting. In some embodiments, the method 200 or portions thereof may be performed serially or in parallel by multiple computing systems.

In some embodiments, the computing system is associated with, comprises, or is comprised in a helmet or a wearable device. For example, the computing system can be attached to a helmet or a wearable device. For example, example, the computing system can be part of a helmet or a wearable device.

After the method 200 begins at block 204, the method 200 proceeds to block 208, where a computing system receives sensor data captured by one or more sensors. The one or more sensors can comprise an image capture device, a Radio Detection and Ranging (Radar), a Light Detection and Ranging (Lidar), an audio capture device, or a combination thereof. The sensor data can comprise a plurality of images. The computing system can receive a plurality of images captured by an image capture device.

In some embodiments, the sensor data comprises a location, a speed, and a direction of the object captured by one or more telemetry and location sensors associated with the object. The one or more sensors can comprise the one or more telemetry and location sensors associated with the object. The one or more telemetry and location sensors associated with the object can comprise a global positioning system (GPS) sensor associated with the object. The computing system 200 of the first vehicle can, for example, determine a location and a trajectory of second vehicle with respect to the first vehicle at a first time at block 212 (described in details below) using the sensor data captured by the one or more telemetry and location sensors of the second vehicle.

For example, a first person is driving a first vehicle which is associated with, or comprises, a computing system 200. A second person is driving a second vehicle approaching the first vehicle from behind. The second vehicle is associated with, or comprises, another computing system 200. The first vehicle can be associated with, or comprise, one or more telemetry and location sensors. The second vehicle can be associated with, or comprise, one or more telemetry and location sensors. The first vehicle can transmit, directly or indirectly, sensor data captured by the one or more telemetry and location sensors of the first vehicle to the second vehicle. The second vehicle can transmit, directly or indirectly, sensor data captured by the one or more telemetry and location sensors of the second vehicle to the first vehicle. The computing system 200 of the first vehicle can, for example, determine a location and a trajectory of second vehicle with respect to the first vehicle at a first time at block 212 (described in details below) using the sensor data captured by the one or more telemetry and location sensors of the second vehicle. The computing system 200 of the second vehicle can, for example, determine a location and a trajectory of first vehicle with respect to the second vehicle at another first time at block 212 (described in details below) using the sensor data captured by the one or more telemetry and location sensors of the first vehicle.

In some embodiments, the computing system comprises the one or more sensors or one or more of the one or more sensors. The computing system can be associated with (e.g., in electrical communication, in wired communication, or in wireless communication) the one or more sensors or one or more of the one or more sensors. In some embodiments, the one or more sensors or one or more of the one or more sensors are associated with a second system, such as a sensor system. The computing system can be associated with (e.g., in electrical communication, in wired communication, or in wireless communication) the second system. The computing system can receive the sensor data captured by the one or more sensors, or the one or more of the one or more sensors, from the second system. In some embodiments, a helmet, a car audio system, or a wearable speaker system or device, is associated with, comprises, or comprised in, the one or more sensors. For example, the computing system can be attached to a helmet and be in electrical, wired, and/or wireless communication with the one or more sensors. For example, the one or more sensors can be attached to a helmet or a wearable device.

The method 200 proceeds from block 208 to block 212, where the computing system determines an object is, or has a likelihood above a likelihood threshold, to be moving relative to a subject (e.g., a user of the system) within a threshold distance of the subject (e.g., the object passing by the subject, or the object impacting the subject) using the sensor data. The computing system can determine the object is, or has the likelihood above the likelihood threshold, to be moving relative to the subject with the threshold distance of the subject at a second time using the sensor data. The computing system can determine an object is passing by, or has a likelihood above a likelihood threshold to pass by, the user at a passing-by time using the sensor data.

In some embodiments, the computing system can determine a location and a trajectory of an object with respect to a subject at a first time using the sensor data. The location and the trajectory of the object with respect to the subject at the first time can indicate the object has a high likelihood to pass by, or to impact, the subject at a second time. The location and the trajectory of the object with respect to the user at the first time indicate the object has a likelihood above a likelihood threshold to pass by the user at a passing-by time.

The computing system can determine the object has the likelihood above the likelihood threshold to be moving relative to the subject within the threshold distance of the subject at a second time based on the location and the trajectory of the object with respect to the subject at the first time. The computing system can determine the object has the likelihood above the likelihood threshold to pass by the user at a passing-by time based on the location and the trajectory of the object with respect to the user at the first time.

In some embodiments, computing system determines the object is, or has the likelihood above the likelihood threshold, to be moving relative to the subject within the threshold distance of the subject (e.g., at the second time) using one or more machine learning methods or models. The computing system can determine an object is passing by, or has the likelihood above the likelihood threshold to pass by, the user at the passing-by time using one or more machine learning methods or models. The computing system can determine the location and the trajectory of the object with respect to the subject at the first time using one or more machine learning methods or models.

The likelihood threshold can be, for example, at least 50%, 60%, 70%, 80%, 90%, 95%, or 99%. The threshold distance can be, for example, at most 0 meter, 1 meter, 2 meters, 5 meters, or 10 meters. The object can pass by the subject, for example, within at most 1 meter, 2 meters, 5 meters, or 10 meters, of the subject.

The object can be a first motor vehicle (e.g., a bicycle, a motorcycle, a car, or a truck). The subject can be in a second motor vehicle. The subject can be riding the second motor vehicle (e.g., a motorcycle, or a bicycle). The subject can be walking. The first motor vehicle can be approaching the subject from behind.

In some embodiments, the computing system can transmit the sensor data, the location and the trajectory of the object with respect to the user at the first time, and/or an indication that the object is passing by, or has the likelihood above the likelihood threshold to pass by, the user at the passing-by time to a third system. The computing system can be associated with (e.g., in electrical communication, in wired communication, or in wireless communication) the third system. For example, the computing system can transmit the sensor data, the location and the trajectory of the object with respect to the user at the first time, and/or an indication that the object is passing by, or has the likelihood above the likelihood threshold to pass by, the user at the passing-by time to a vehicle's audio system or a vehicle's control system.

The object may not be (or is not) in a visual field of the subject at the first time, the second time, and/or the passing-by time. The object may be (or is) in a periphery (such as the far periphery and/or the extreme periphery) of the visual field of the subject at the first time, the second time, and/or the passing-by time. The object may be (or is) in a far periphery of the visual field of the subject at the first time, the second time, and/or the passing-by time. The may be (or is) in an extreme periphery of the visual field of the subject at the first time, the second time, and/or the passing-by time. The far periphery of the visual field of the user can comprise, for example, about 60° to about 110° temporally away from a nose and towards a temple of the subject. The far periphery of the visual field of the user can comprise, for example, from about 50°, about 55°, about 60°, about 65°, or about 70° to about 100°, about 105°, about 110°, about 115°, or about 120° temporally away from a nose and towards a temple of the subject. The extreme periphery of the visual field of the user can comprise, for example, about 90° to 110° temporally away from the nose and towards the temple of the subject. The far periphery of the visual field of the user can comprise, for example, from about 80°, about 85°, about 90°, about 95°, or about 100° to about 100°, about 105°, about 110°, about 115°, or about 120° temporally away from a nose and towards a temple of the subject.

In some embodiments, the first time is a time the sensor data, or the plurality of images, or a portion thereof, is captured. The first time can be a time after the sensor data, or the plurality of images, or a portion thereof, is captured. The first time can be a time immediately after (e.g., within 0.0000001 second, 0.000001 second, 0.00001 second, 0.0001 second, 0.001 second, 0.01 second, 0.1 second, or 1 second) the sensor data, or the plurality of images, or a portion thereof, is captured.

The method 200 proceeds from block 212 to block 216, where the computing system determines an auditory stimulus with a characteristic that corresponds to an auditory characteristic of the object moving relative to the subject within the threshold distance of the subject. The computing system can determine an auditory stimulus based on the location and the trajectory of the object with respect to the subject at the first time. A characteristic of the auditory stimulus can correspond to an auditory characteristic of the object moving relative to the subject within the threshold distance of the subject. The computing system can determine an auditory stimulus with a characteristic selected from a group comprising a falling pitch. The computing system can determine an auditory stimulus and an output time to output the auditory stimulus based on the location and the trajectory of the object with respect to the user at the first time. The output time can be the passing-by time, or the output time can be between the first time and the passing-by time. The computing system can determine an auditory stimulus needs to be outputted based on the location and the trajectory of the object with respect to the user at the first time. A characteristic of the auditory stimulus can be selected from a group comprising a falling pitch. The auditory stimulus can be preselected. The characteristic of the auditory stimulus (e.g., a falling pitch) can be preselected.

In some embodiments, the output time is the second time (at which the object is determined to have the likelihood above the likelihood threshold to be moving relative to the subject within the threshold distance of the subject) or the passing-by time (at which the object has the likelihood above the likelihood threshold to pass by the user). The output time can be immediately prior (e.g., with 0.0000001 second, 0.000001 second, 0.00001 second, 0.0001 second, 0.001 second, 0.01 second, 0.1 second, or 1 second) to the second time or passing-by time. The output time can be between the first time and the second time or passing-by time.

In some embodiments, the characteristic of the auditory stimulus is a falling pitch. For example, the auditory stimulus can be a 1000 Hz beep with a decreasing or falling pitch of 10% or 100 Hz. The pitch can decrease or fall by, for example, 1%, 5%, 10%, 15%, 20%, or more of the frequency of the auditory stimulus. The pitch can decrease or fall by, for example, 10 Hz, 50 Hz, 100 Hz, 150 Hz, 200 Hz, or more. The decrease or fall in the pitch of the auditory stimulus can occur within 0.0000001 second, 0.000001 second, 0.00001 second, 0.0001 second, 0.001 second, 0.01 second, 0.1 second, or 1 second. The auditory stimulus can have fade-in and fade-out effects. In some embodiments, the auditory stimulus comprises a narrow range of frequencies (e.g., 1 Hz, 10 Hz, or 100 Hz) or a pure tone (e.g., 250 Hz, 500 Hz, 750 Hz, 800 Hz, 900 Hz, 1000 Hz, 1100 Hz, or 1200 Hz). In some embodiments, the auditory stimulus comprises music, speech, or a combination thereof.

In some embodiments, the characteristic of the auditory stimulus is selected from a group comprising a falling pitch, increasing loudness, a higher number of frequencies, a higher frequency, a regularity in angular difference, a peculiarity in angular difference, a sound shadow, a larger angular size, a loudness asymmetry for ears of the subject (or user), a head related transfer function of about 90°, a vertical location below a horizon of the subject (or user), or a combination thereof. In some embodiments, a change in the characteristic of the auditory stimulus is at a fastest or highest at, or at about, the passing-by time.

The method 200 proceeds from block 216 to block 220, where the computing system causes the auditory stimulus to be outputted to the subject at an output time. The computing system can cause one or more audio output devices to output the auditory stimulus at the output time. The computing system can be associated with, comprises, or comprised in, the one or more audio output devices. Another system can comprise the one or more audio output devices, such as a helmet, a car audio system, or a wearable speaker system or device. The computing system can transmit the auditory stimulus and/or the output time to the other system. The computing system can cause the one or more audio output device of the other system to output the auditory stimulus at the output time.

The auditory stimulus can increase a likelihood of the subject to visually perceive the object in the periphery (e.g., far periphery and/or extreme periphery) of the visual field of the subject at the output time or a time immediately after the output. The auditory stimulus can increase a likelihood of the user to visually perceive the object in the far periphery and/or extreme periphery of the visual field of the user at the output time or a time immediately after the output time. The increase in the likelihood can be, for example, at least 10%, 20%, 30%, 40%, or 50%. The time immediately after the output time can be, for example, within 0.0000001 second, 0.000001 second, 0.00001 second, 0.0001 second, 0.001 second, 0.01 second, 0.1 second, or 1 second of the output time.

Left and Right Audio Output Devices. In some embodiments, the location and the trajectory of the object with respect to the subject at the first time indicate the object is likely to pass by, or impact, the subject on a left side or a right side of the subject at the second time (or the passing-by time). The computing system can cause the auditory stimulus to be outputted to a left ear or a right ear, respectively, of the subject at the output time.

In some embodiments, the one or more audio output devices comprises a left audio output device and a right audio output device for outputting the auditory stimulus to a left ear and/or a right ear of the subject. A headset such as an over-the-ear headset can comprise a left speaker and a right speaker for outputting the audio stimulus to the left ear and/or the right ear of the subject, respectively. A car audio system can comprise a left speaker and a right speaker. When the left speaker of the car audio system outputs the audio stimulus, although the subject can hear the audio stimulus with both ears, the subject can hear the audio stimulus with his or her left ear first.

The location and the trajectory of the object with respect to the subject at the first time can indicate the object is likely to pass by, or impact, the subject on a left side of the user at the passing-by time or the second time (at which the object is determined to have the likelihood above the likelihood threshold to be moving relative to the subject within the threshold distance of the subject). The computing system can cause the left audio output device to output the auditory stimulus to the left ear of the user at the output time. The location and the trajectory of the object with respect to the subject can indicate the object is likely to pass by, or impact, the subject on a right side of the user at the passing-by time or the second time. The computing system can cause the right audio output device to output the auditory stimulus to the right ear of the user at the output time.

The method 200 ends at block 224.

System for Improving User Safety

Speaker Configuration

Figure 3A:
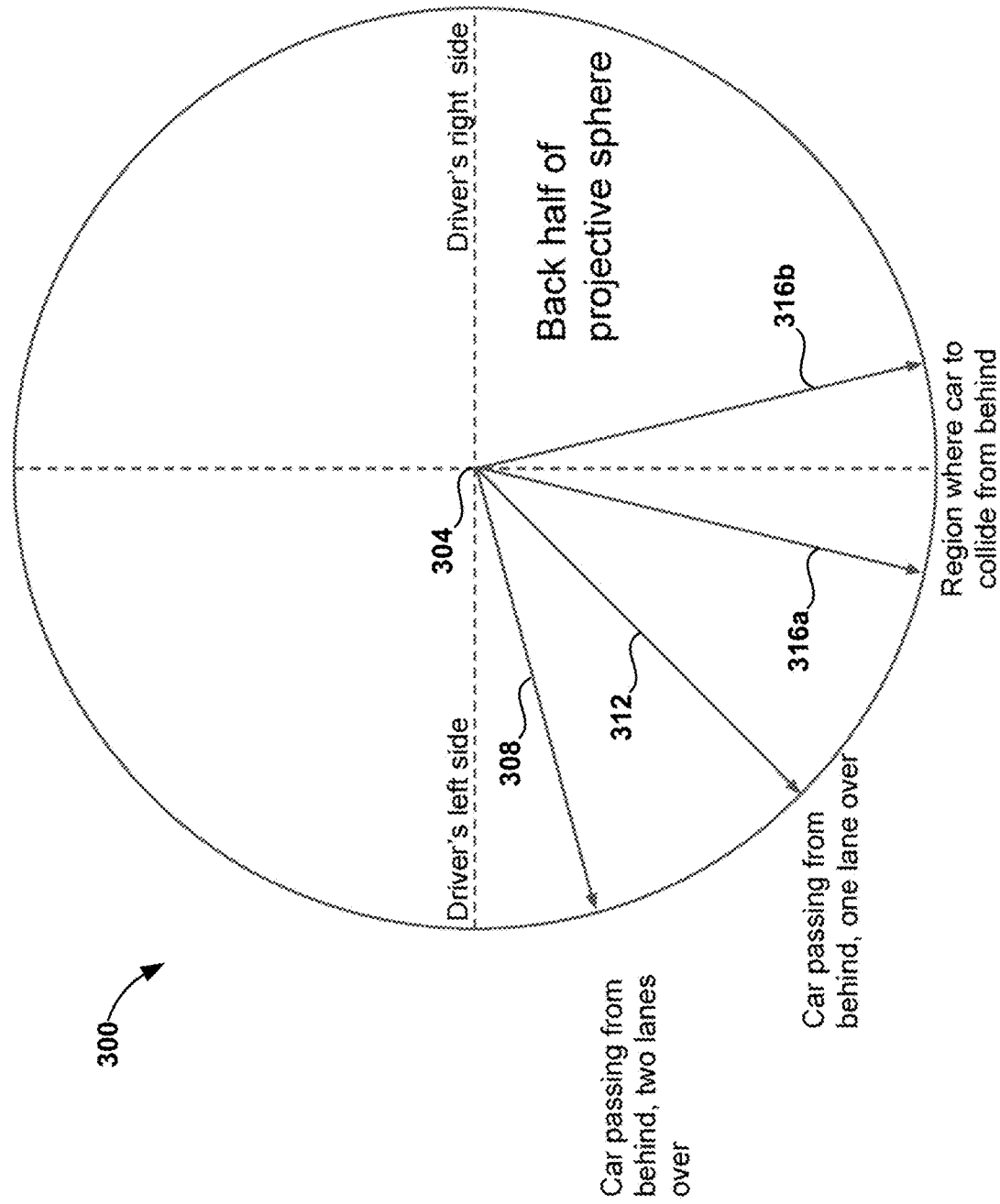
Figure 3B:
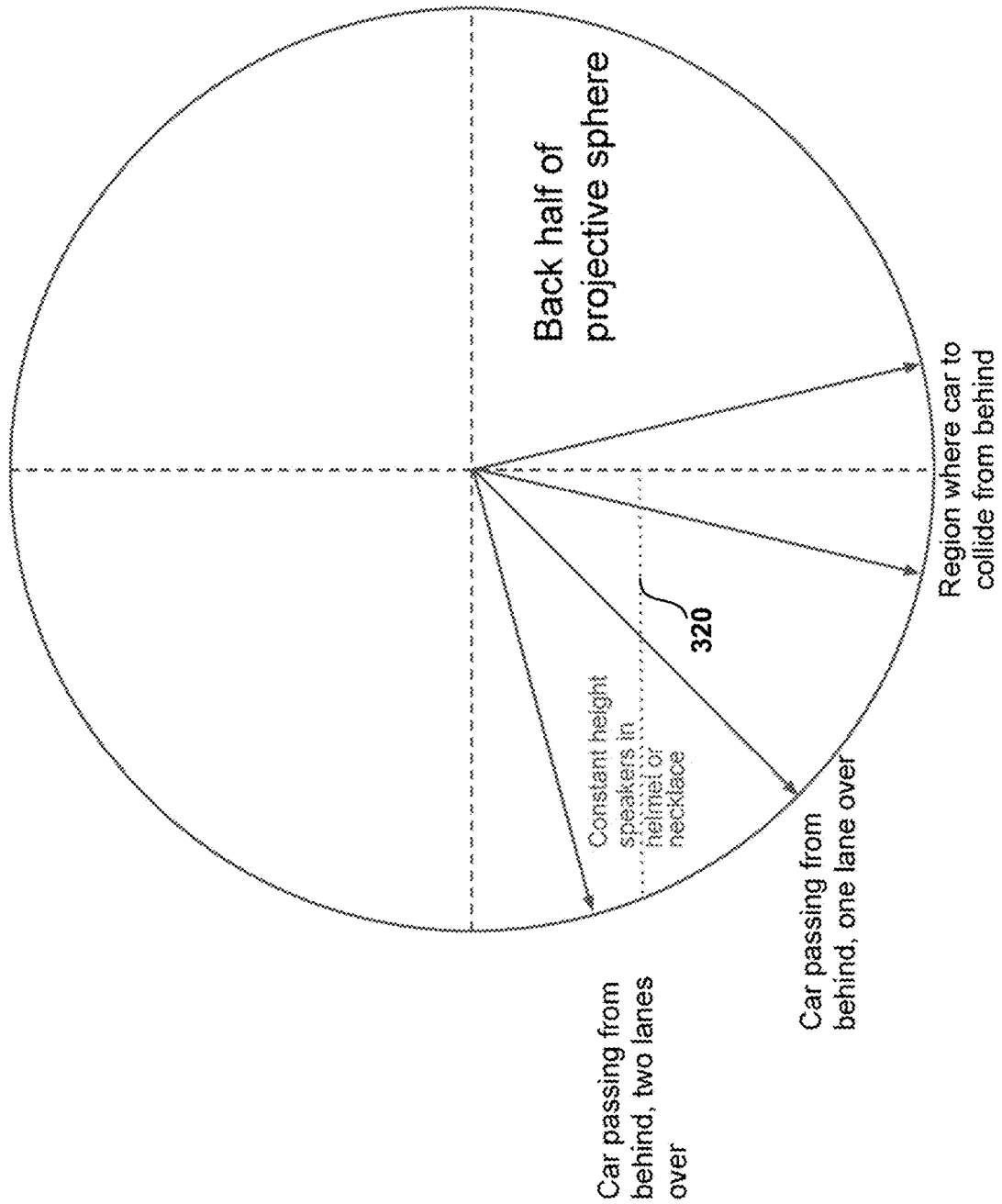

FIGS. 3A-3D are schematic illustrations showing non-limiting exemplary placements of auditory output devices of a system (e.g., speakers of a smart helmet or wearable device) for improving user safety by, for example, enhancing visual motion perception in the far periphery and extreme periphery. FIG. 3A shows the posterior projective field 300 of a person, i.e., behind the person. For most moving objects around a person (e.g., a driver, or a rider, of a vehicle), the sound disproportionately comes from below the person's perceptual horizon. A person's perceptual horizon is at the level of the person's eyes and ears. Without being bound by theory, the sounds of moving objects around a person come from below the person's horizon because moving objects propel themselves upon the ground, and so make considerable noise interacting with the ground. Furthermore, the engine noises from cars (and vehicles generally) also tend to be below the person's eye level. Cars on the road very far behind a person (and going in the same direction) tend to be at the center point of the horizon (where the dotted lines cross 304c0). As the cars approach the person (or a vehicle the person is operating, such as driving or riding, or is in), these cars tend to move down and out in the person's projective field. A car passing a few lanes over the person will move more out than down (see leftmost arrow or trajectory 308). A car passing one lane over will move more down and less out (see arrow or trajectory 312 at about 7 o'clock). An object on a collision course to the person's rear end will move mostly just down, and very little out (see the region between the two lower arrows or trajectories 316a, 316b).

Given the characteristic paths of objects in the projective field behind a person in FIG. 3A, placing speakers in a helmet or on wearable device (e.g., a neck device) can present challenges. If the speakers are placed at constant height around the person's head, then the speakers will track more as the dotted horizontal line 320 on the left in FIG. 3B, unlike the motion of cars behind the driver moving in the same direction.

In some embodiments, a helmet is equipped with a two-dimensional array of speakers 324, 328a-328h, 332a-332h, in the posterior visual field as shown in FIG. 3C. In some embodiments, a helmet is equipped with a two-dimensional array of speakers comprising a speaker 324, one or more of speakers 328a-328h, and/or one or more of speakers 332a-332h, in the posterior visual field. In some embodiments, a helmet is equipped with a two-dimensional array of speakers 324, 328a-328h, 332a-332h and one or more speakers for each radial line. For the reasons discussed with reference to FIG. 3A, for any location of a car behind the person, there is a unique spot on the posterior projective field corresponding to that location. Thus, activation of any particular speaker can uniquely cue (or indicate to) the person a particular three-dimensional location of a car on the road behind the person.

Figure 3D:
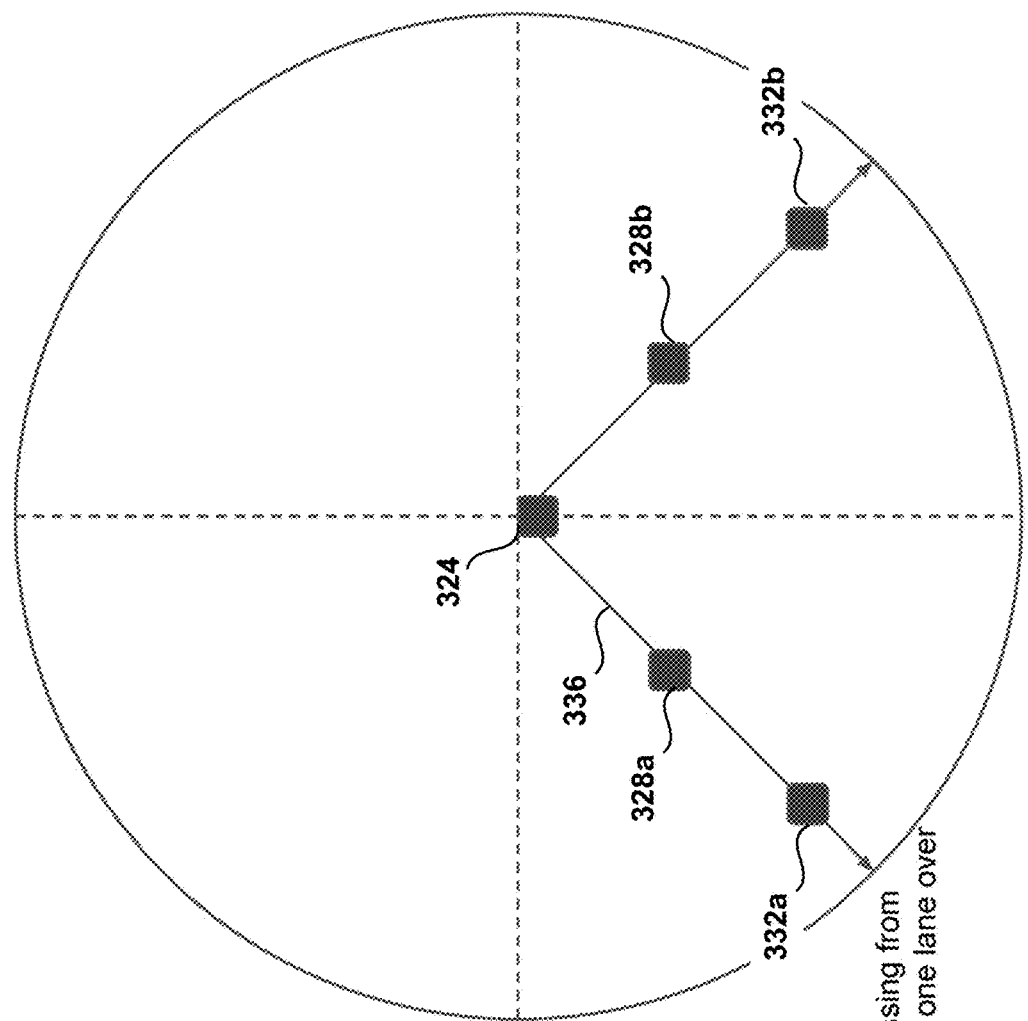

For a neck device (or a wearable device) with just a single contour or row of speakers, the device can include speakers 332a, 328a, 324, 328b, 332b positioned according to the "car passing from behind, one lane over" curve or pattern 340 shown in FIG. 3D. The device can rise up as the device moves toward the back of the head of the person using (e.g., wearing) the device, or the device can have speakers reaching up from the device accordingly. If a helmet (or a wearable device) includes a single row of speakers, the speakers can be positioned according to the "car passing from behind, one lane over" curve or pattern 336 on the back of the helmet, rather than a straight line. The single row of speakers 332a, 328a, 324, 328b, 332b so positioned can be used to track a typical passing car. When a car will collide with the person wearing the helmet from behind, two or more of the speakers 332a, 328a, 324, 328b, 332b with the same eccentricity or different eccentricities can be activated. For example, the pair of speakers 332a, 332b can be activated. As another example, the pairs of speakers 328a, 328b can be activated. The two or more of the speakers 332a, 328a, 324, 328b, 332b activated can have the same eccentricity or different eccentricities. The two or more of the speakers 332a, 328a, 324, 328b, 332b activated can output the auditory stimulus with the same loudness or different loudness at corresponding times. In some embodiments, when a car will collide with the person wearing the helmet from behind, one of the speakers 332a, 328a, 324, 328b, 332b can be activated.

Speaker Activation

FIGS. 4A-4F are schematic illustrations showing non-limiting exemplary activations of auditory output devices of a system (e.g., speakers of a smart helmet or wearable device) for improving user safety by, for example, enhancing visual motion perception in the far periphery and extreme periphery.

Figure 4A:
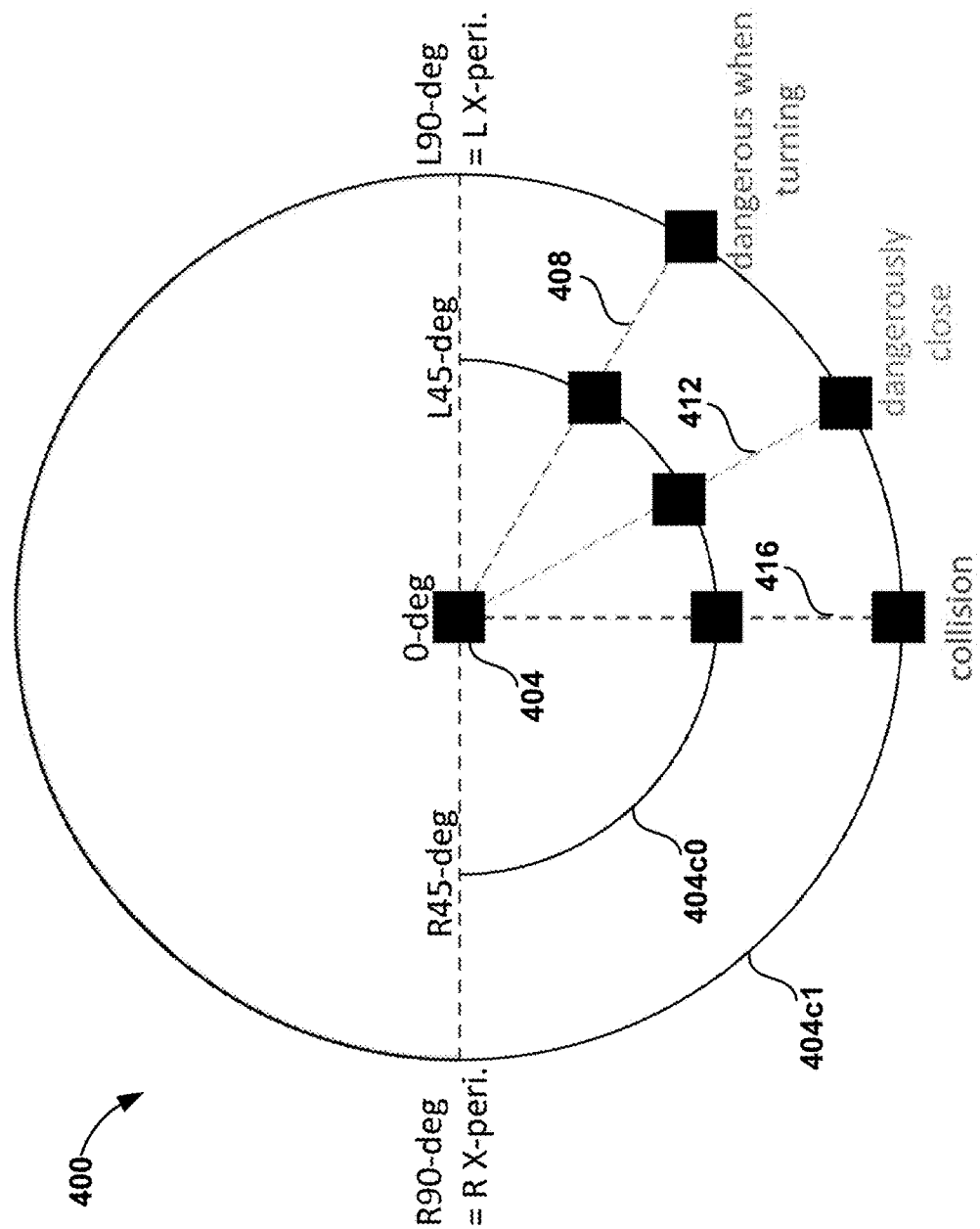

FIG. 4A shows the posterior projective field 400 of a person, i.e., behind the person. A car on the road very far behind a person (and going in the same direction) tends to be at the center point of the horizon (at 0 degree 404) in the projected field. As a car approaches the person (or a vehicle the person is operating, such as driving or riding, or is in), the car tends to move down in the projected field and out in the person's projective field. For example, the car can move from 0 degree to 45 degrees (represented by the 45-degree contour 404c1) in the person's projected field as the car approaches the person from afar. The car can then move from 45 degrees to 90 degrees (represented by the 90-degree contour 404c2) in the person's projected, which can be in the extreme periphery of the person, when the car gets really close to the person (e.g., the car is right behind the person, or the car is right next to the person as the car is passing by the person). A car passing a few lanes over the person will move more out than down (see line or trajectory 408 for an example). A car passing one lane over will move more down and less out (see line or trajectory 412 for an example). An object on a collision course to the person's rear end will move mostly just down, and very little out (see line or trajectory 416 for an example).

Referring to FIGS. 4B1 and 4B2, sound generation can start when an object (e.g., a car) comes from behind in fixed distance (e.g., 50 m). In some embodiments, the sounds generated can have one or three tones: a low tone for a large object (e.g. trucks), a middle tone for a midsize object (e.g., car), and, a high tone for a small object (e.g., a motorcycle).

In some embodiments, the sounds generated can have one or three tones: a low tone for a small object (e.g., a motorcycle), a middle tone for a midsize object (e.g., car), and, a high tone for a large object (e.g. trucks). Each tone can have a narrow range of frequency, or a pure tone (e.g., 250 Hz, 500 Hz, or 1000 Hz).

Figure 4C:
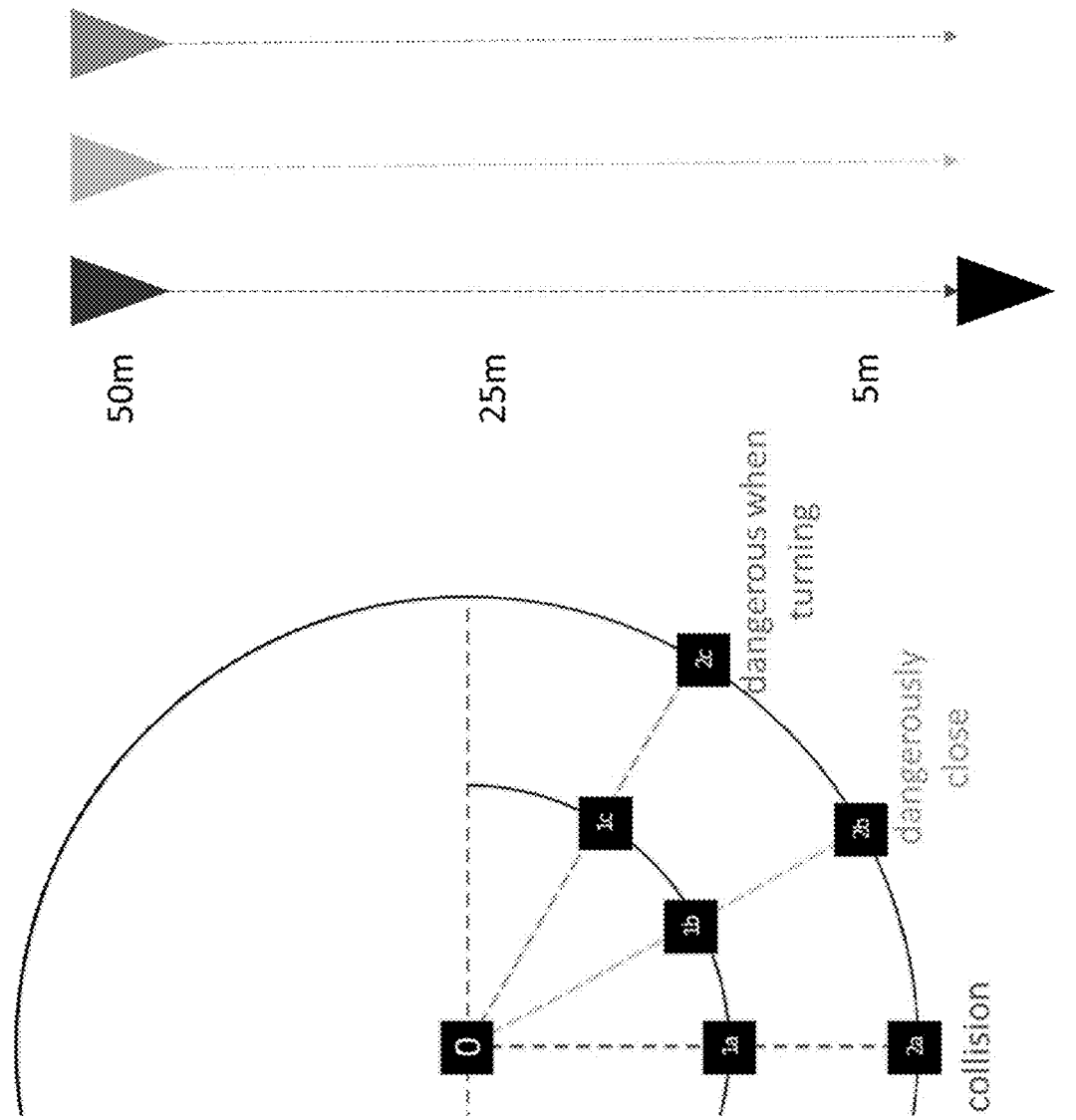

Referring to FIG. 4C, when the object comes from behind at, for example, 50 meters distance, speaker 0 can start generating a single tone at a small loudness. The tone can reflect the object's size: 250 Hz for a large truck, 500 Hz for a car, and 1000 Hz for motorcycle. The tone can be adjusted by the speed of the object: a higher tone for a higher speed, and a lower tone for lower speed. For example, a single tone of 1050 Hz can be generated for a motorcycle at a high speed. As another example, a single tone of 950 Hz can be generated for a motorcycle at a low speed.

Figure 4D:
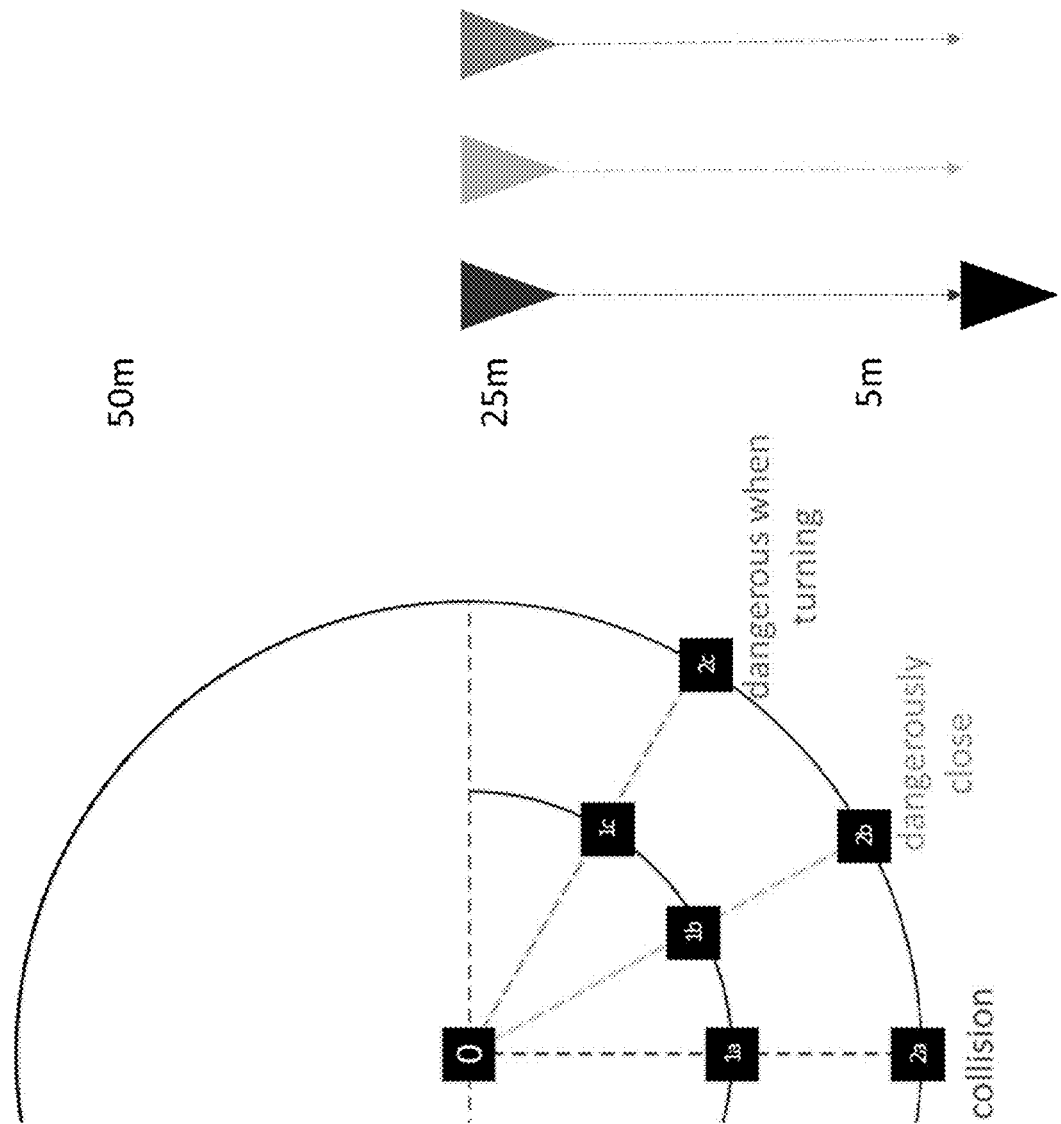

Referring to FIG. 4D, when the object is behind the person at, for example, 25 meters distance, a speaker $1x$ (e.g., speaker $1a$, $1b$, or $1c$), or multiple speakers $1x$, can start generating multiple tones at a moderate loudness. The tones can be the tone generated as described with reference to FIG. 4C based on the size of the object (and possibly adjusted by the speed of the object) plus a narrow range of frequency (e.g., ±1%, ±2%, ±5%, or ±10%, or ±10 Hz, ±20 Hz, ±50 Hz, or ±100 Hz). For example, if the tone generated when the object is 50 meters behind the person is 250 Hz, the multiple tones generated when the truck is 25 meters behind the person can be 250 Hz±5%. A different speaker, or different speakers, can be activated based on the trajectory of the object. Different trajectories can result in different speakers activated. For example, if the object is approaching from behind with a trajectory that is a collision course, then speaker $1a$ can be activated. If the object is approaching from behind with a trajectory that is dangerously close, then speaker $1b$ can be activated. If the object is approaching from behind with a trajectory that is dangerous when the person is turning, then speaker $1c$ can be activated. In some embodiments, the speaker $1c'$ or $1c$ can be activated if the object is approaching from behind with a trajectory that is dangerous when the person is turning right or left, respectively.

Figure 4E:
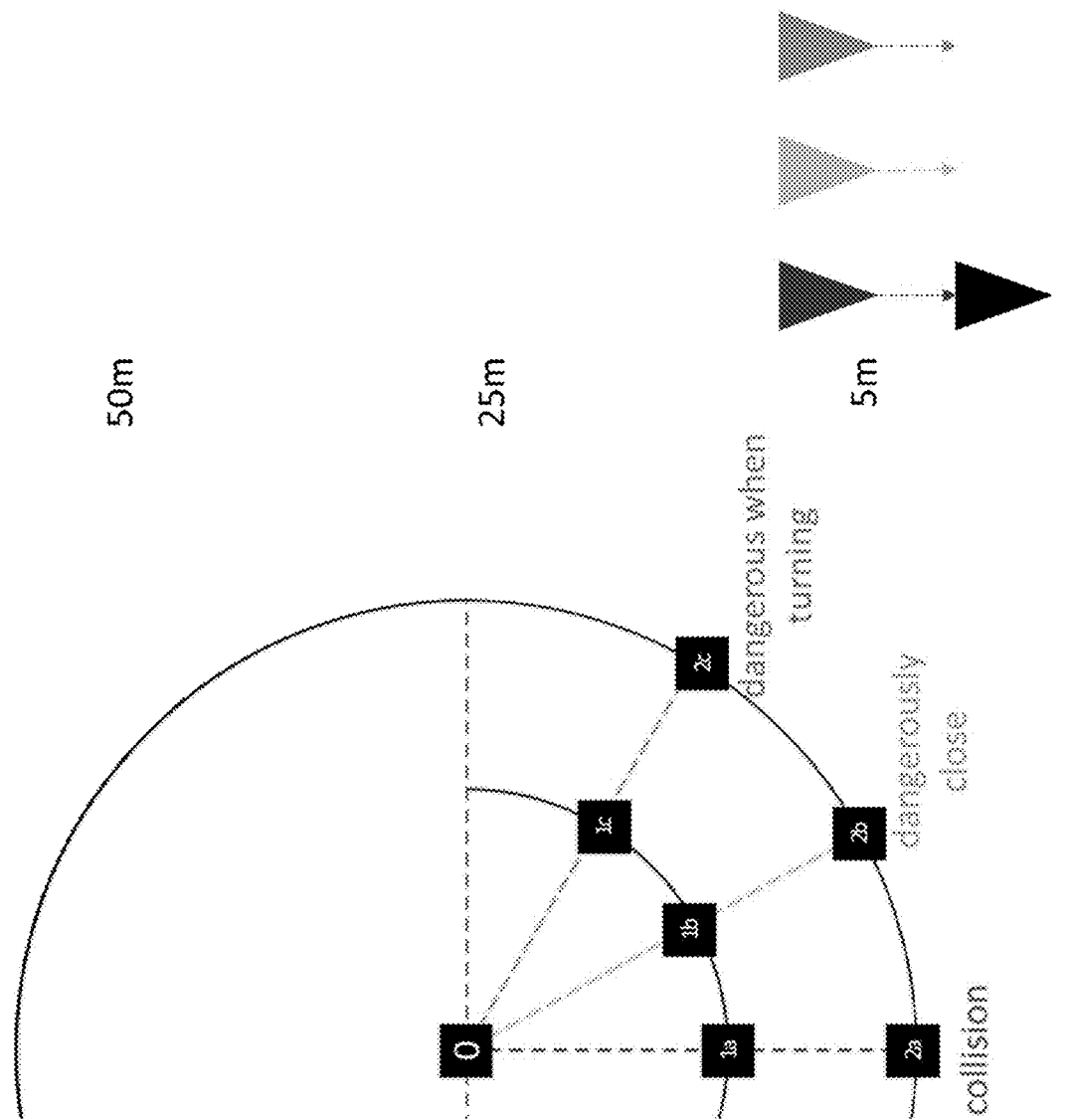

Referring to FIG. 4E, when object is behind the person at, for example, 5 meters distance, a speaker $2x$ (e.g., speaker $2a$, $2b$, or $2c$), or multiple speakers $2x$, in addition to speaker $1x$, can start generating multiple tones at a high loudness. The tones can be the tone generated as described with reference to FIG. 4C based on the size of the object (and possibly adjusted by the speed of the object) plus a narrow range of frequency. For example, if the tone generated when the object is 50 meters behind the person is 250 Hz, the multiple tones generated when the truck is 25 meters behind the person can be 250 Hz±5%. Different speakers can be activated based on the trajectory of the object. Different trajectories can result in different speakers activated. For example, if the object is approaching from behind with a trajectory that is a collision course, then speakers $1a$ and $2a$ can be activated. If the object is approaching from behind with a trajectory that is dangerously close, then speakers $1b$ and $2b$ can be activated. If the object is approaching from behind with a trajectory that is dangerous when the person is turning, then speakers $1c$ and $2c$ can be activated. Two (or more) speakers activated can imitate a larger angler size of the sound source, the object, when the object is closer to the person. In some embodiments, the speakers $1c'$ and $2c'$, or $1c$ and $2c$, can be activated if the object is approaching from behind at, for example, 5 meters distance with a trajectory that is dangerous when the person is turning right or left, respectively.

Figure 4F:
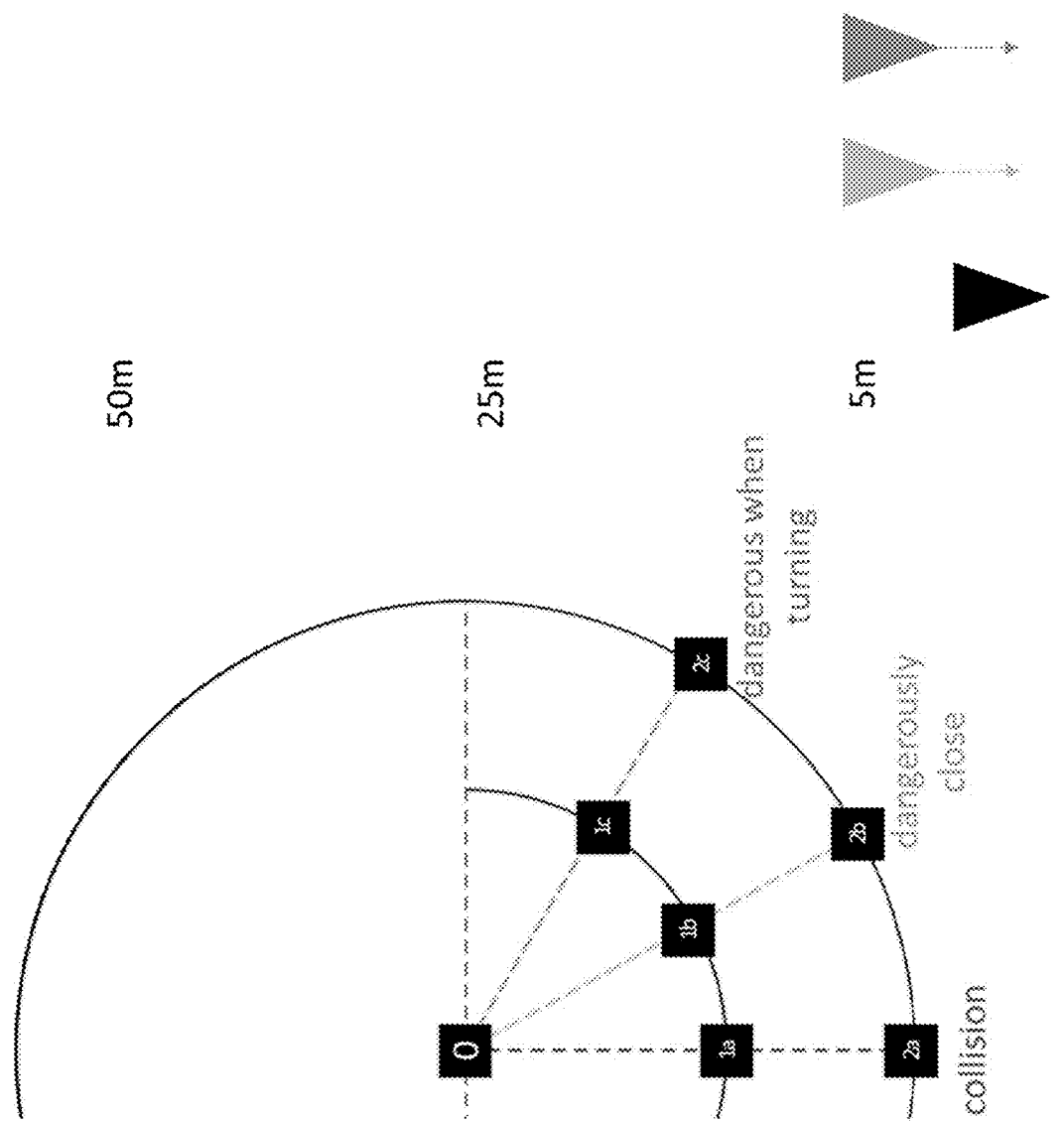

Referring to FIG. 4F, when object is in the extreme periphery of the person (e.g., from approximately 90 degrees) with a trajectory that is dangerously close or dangerous when turning, speakers 1x and 2x (e.g., speakers 1b and 2b for the trajectory that is dangerously close) can generate a sudden pitch falling to have cross-modal enhancement of motion detection in the extreme periphery as described herein.

Auditory Stimuli

There are regularities in how stimuli change depending on the behavior of a vehicle approaching a person. Below are some regularities.

A. One-to-One Mapping Between Lower Posterior Projective Field and Car Position.

A car behind a driver moving in the same direction can lie upon one of the contours in FIG. 3A, depending on how far behind the car is, and how many lanes over the car is. There tends to be a one-to-one mapping between the positions on the lower-half of the posterior projection sphere and all possible three-dimensional (3D) positions of the car on the road behind the driver. For any car's 3D position on the road behind the driver, the speaker corresponding to that 3D position can be activated. Interpolation of outputs of speakers can help cue intermediate 3D positions without any corresponding speaker. For example, referring to FIG. 3D, speakers 328a and 328b can be activated (e.g., with different loudness) to simulate a 3D position of the car that corresponds to a position between the speakers in the posterior projective field. As another example, speakers 328a and 332a in FIG. 3D can be activated to simulate a 3D position of the car that corresponds to a position between the two speakers in the posterior projective field.

B. The Car's Pitch Due to Doppler.

The pitch of a car behind the person depends on their relative speed. If the car is moving at the same speed as the person, the car can have some baseline pitch, neither high n or low. The faster the car is moving relative to the person (e.g., the faster the car is approaching the person), the higher its pitch can be above the baseline. The slower the car is moving relative to the person (e.g., the car is falling behind), the lower its pitch can be below the baseline. For a car being tracked, the pitch of the auditory sound or stimulus generated and outputted to the person corresponding to the car can vary depending on the relative speed (and exaggerated in extent in some embodiments).

C. the Car's Loudness.

The loudness of the speaker activated that corresponds to the car behind the person can correspond to the car's actual loudness given its actual linear distance. The distance can be computed directly from the car's position in the lower posterior projection sphere. Speakers nearer the horizon on the projection sphere (or helmet) can be quieter than speakers activated further out along the projection sphere when the car is accordingly physically closer.

D. Use of Tactile Stimulation.

Tactile stimulation can have two ecologically appropriate roles, and both of which can be relevant simultaneously depend on the following two factors.

a. When a car behind a person is nearby, the sound from the car can be loud enough to actually induce tactile stimulation. The tactile intensity from one or more stimulators (e.g., one or more speakers) of a helmet or necklace can vary as the inverse square of distance between the person and the car. Also, when nearby, the tactile stimulation can be over a wider region of stimulators (e.g., speakers), with a peak centered at the appropriate location on the posterior projection sphere.

b. Tactile stimulation can also result from to the wind caused by a car approaching a person. Tactile stimulation from an auditory stimulus generated by one or more speakers of a helmet or necklace can be proportional to the Doppler shift above baseline.

Improving User Safety

Figure 5:
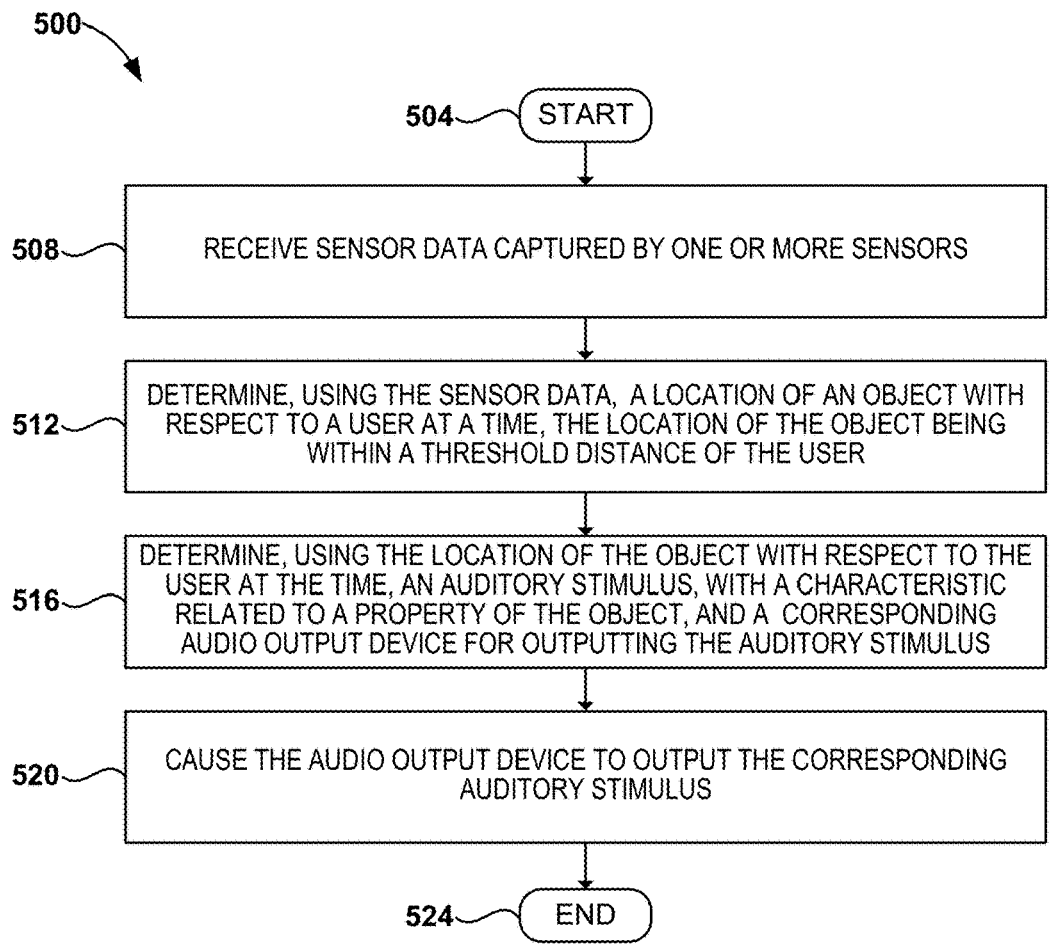
FIG. 5 is a flow diagram showing an exemplary method of improving user safety.

FIG. 5 is a flow diagram showing an exemplary method 500 of improving user safety. The method 500 may be embodied in a set of executable program instructions stored on a computer-readable medium, such as one or more disk drives, of a computing system or device. For example, the computing system 600 shown in FIG. 6 and described in greater detail below can execute a set of executable program instructions to implement the method 500. When the method 500 is initiated, the executable program instructions can be loaded into memory, such as RAM, and executed by one or more processors of the computing system 600. Although the method 500 is described with respect to the computing system 600 shown in FIG. 6, the description is illustrative only and is not intended to be limiting. In some embodiments, the method 200 or portions thereof may be performed serially or in parallel by multiple computing systems.

The computing system can comprise, or be associated with (e.g., in communication with, such as electrical communication, wired communication, or wireless communication), one or more sensors. The one or more sensors can be associated with a helmet. The one or more sensors can capture different types of sensor data.

The computing system can comprise, or be associated with, a plurality of audio output devices (e.g., the speakers 332a, 328a, 324, 328b, 332 described with reference to FIG. 3D, or the speakers 0, 1c', 1b', 1a-1c, 2c', 2b', 2a-2c described with reference to FIG. 4B2) for outputting auditory stimuli that mimic sounds from (1a) the horizon and (1b) below the horizon of a user and from (2a) the left side of, (2b) directly behind, and (2c) the right side of a user of the computing system. The system can be associated with, can comprise, or can be comprised in a helmet or a wearable device (such as an augmented reality or mixed reality device). The plurality of audio output devices can be on, in, or within, the helmet or the wearable device. The plurality of audio output devices can be positioned for outputting auditory stimuli that mimic sounds from (1a) the horizon and (1b) below the horizon of the user and from (2a) the left side of, (2b) directly behind, and (2c) the right side of the user. FIGS. 3C, 3D, 4B1, and 4B2 and accompanying descriptions show non-limiting exemplary schematic illustrations of positioning of the plurality of audio output devices for mimicking sounds from (1a) the horizon and (1b) below the horizon of the user and from (2a) the left side of, (2b) directly behind, and (2c) the right side of the user.

In some embodiments, the plurality of audio output devices comprises: (i) a horizon-level audio output device (e.g., speaker 324 in FIG. 3D, or speaker 0 in FIGS. 4B1 and 4B2) for outputting auditory stimuli that mimic sounds from a center point of the horizon of a user when wearing the helmet or the wearable device, and (ii) a first left below-horizon audio output device and a first right below-horizon audio output device (e.g., speakers 328b, 328a in FIG. 3D, or speakers 1b and 1b' in FIG. 4B2) of a first contour (e.g., the 45-degree contour) on, or of, the helmet or the wearable device for outputting auditory stimuli that mimic sounds from a first vertical level below the horizon of the user on a left side and a right side of the user, respectively, when wearing the helmet or the wearable device. The plurality of audio output devices can comprise a center below-horizon audio output device (e.g., speaker 1a in FIG. 4B2) of the first contour for outputting auditory stimuli that mimic sounds from below the horizon and the center point of the user.

In some embodiments, the plurality of audio output devices comprises (iii) a first left below-horizon audio output device and a first right below-horizon audio output device (e.g., speakers 332b, 332a in FIG. 3D, or speakers 2b and 2b' in FIG. 4B2) of a second contour (e.g., the 90-degree contour) on, or of, the helmet or wearable device for outputting auditory stimuli that mimic sounds from a second vertical level below the horizon of the user on a left side and a right side of the user, respectively, when wearing the helmet or the wearable device. The second vertical level can be below the first vertical level. The second contour can be below the first contour.

In some embodiments, the plurality of audio output devices comprises (ii) a second left below-horizon audio output device and a second right below-horizon audio output device (e.g., speakers 1c and 1c' in FIG. 4B2) of the first contour on, or of, the helmet or the wearable device for outputting auditory stimuli that mimic sounds from the first vertical level below the horizon of the user, respectively, when wearing the helmet or the wearable device. The sounds mimicked by the auditory stimuli outputted by the second left below-horizon audio output device can be to a left of the sounds mimicked by the auditory stimuli outputted by the first left below-horizon audio output device of the first contour. The sounds mimicked by the auditory stimuli outputted by the second right below-horizon audio output device can be to a right of the sounds mimicked by the auditory stimuli outputted by the first right below-horizon audio output device of the first contour. The second left below-horizon audio output device can be to a left of the first left below-horizon audio output device of the first contour. The second right below-horizon audio output device can be to a right of the first right below-horizon audio output device of the first contour.

After the method 500 begins at block 504, the method 500 proceeds to block 508, where a computing system (e.g., the computing system 600 shown in FIG. 6) receives first sensor data captured by one or sensors. In some embodiments, the one or more sensors comprises an image capture device, a Radio Detection and Ranging (Radar), a Light Detection and Ranging (Lidar), an audio capture device, or a combination thereof.

The method 500 proceeds from block 508 to block 512, where the computing system determines a first location of an object with respect to the user at a first time using the first sensor data (e.g., image data, Radar data, Lidar data, audio input, telemetry data, and location data). The first location of the object with respect to the user at the first time can correspond to a position in the posterior projective field of the user, such as the center point of the horizon at 0 degree. The computing system can determine the first location of the object with respect to the user at the first time using one or more machine learning methods or models. The first location of the object with respect to the user can be within a first threshold distance of the user. The first threshold distance can be, for example, 1 meter, 2 meters, 5 meters, 10 meters, 20 meters, or 100 meters. For example, the object can be 50 meters behind the user. In some embodiments, the object is a first motor vehicle. In some embodiments, the user is in a second motor vehicle or is riding the second motor vehicle.

The method 500 proceeds from block 512 to block 516, where the computing system determines one or more first auditory stimuli and corresponding one or more first audio output devices of the plurality of audio output devices for outputting the one or more first auditory stimuli using the first location of the object with respect to the user at the first time. A characteristic of the first auditory stimulus can be related to a property of the object. A characteristic of the first auditory stimulus can be related to at least one property of the object.

In some embodiments, the one or more first auditory stimuli and the corresponding one or more first audio output devices comprise two or more first auditory stimuli and corresponding two or more first audio output devices. A combination of the two or more first auditory stimuli outputted by the corresponding first audio output devices can mimic a sound of the object moving at the first location with respect to the user at the first time that none of the plurality of audio output devices individually is capable of mimicking. For example, speakers 328a and 328b in FIG. 3D can be activated (e.g., with different loudness) to simulate a 3D position of the car that corresponds to a position between the speakers in the posterior projective field. As another example, speakers 328a and 332a in FIG. 3D can be activated to simulate a 3D position of the car that corresponds to a position between the two speakers in the posterior projective field.

In some embodiments, the one or more first auditory stimuli comprise a narrow range of frequencies (e.g., 1 Hz, 10 Hz, or 100 Hz) or a pure tone (e.g., 250 Hz, 500 Hz, 750 Hz, 800 Hz, 900 Hz, 1000 Hz, 1100 Hz, or 1200 Hz). In some embodiments, the one or more first auditory stimuli comprises music, non-music, speech, non-speech, or a combination thereof.

In some embodiments, the characteristic of the first auditory stimulus is a pitch of the first auditory stimulus. The characteristic of the first auditory stimulus can be related to the property of the object, such as a size of the object. The pitch of the first auditory stimulus can correlate positively, or negatively, with the size of the object. In some embodiments, the characteristic of the first auditory stimulus is a loudness of the first auditory stimulus. The characteristic of the first auditory stimulus can be related to the property of the object (e.g., the property of the object at the first time), such as a speed of the object. The loudness of the first auditory stimulus can correlate positively, or negatively, with the speed of the object. In some embodiments, the characteristic of the first auditory stimulus is a pitch of the first auditory stimulus. The characteristic of the first auditory stimulus can be related to the property of the object, such as a size and a speed of the object. The pitch of the first auditory stimulus can correlate positively, or negatively, with the size of the object. The pitch of the first auditory stimulus can correlate positively, or negatively, with the speed of the object.

The method 500 proceeds from block 516 to block 520, where the computing system cause each of the one or more first audio output devices to output the corresponding first auditory stimulus of the one or more first auditory stimuli. For example, when the object comes from behind in, for example, 50 meters distance of the user, speaker 0 as described with reference to FIG. 4C starts generating single tone at small loudness.

Object is Close

In some embodiments, the computing system can receive second sensor data captured by the one or more sensors. The computing system can determine a second location of the object with respect to the user at a second time using the second sensor data. The second location of the object with respect to the user at the second time can correspond to a position in the posterior projective field of the user, such as a position on the 45-degree contour. The second location of the object with respect to the user can be within a second threshold distance of the user. The second threshold distance can be, for example, 1 meter, 2 meters, 5 meters, 10 meters, 20 meters, or 100 meters. The second threshold distance can be shorter than (or longer than, or the same as) the first threshold distance. The computing system can determine one or more second auditory stimuli and corresponding one or more second audio output devices of the plurality of output devices for outputting the one or more second auditory stimuli using the second location of the object with respect to the user at the second time. The computing system can cause each of the one or more second audio output devices to output the corresponding second auditory stimulus of the one or more second auditory stimuli. For example, when the object comes from behind in, for example, 25 meters distance of the user, one of speakers 1a, 1b, and 1c as described with reference to FIG. 4D can start generating multiple tones at moderate loudness depending on the trajectory of the car.

A characteristic of the second auditory stimulus can be related to the property of the object (e.g., the property of the object at the second time). A difference between a characteristic of the second auditory stimulus relative to the characteristic of the first auditory stimulus can be related to the second location of the object with respect to the user at the second time. A difference between a characteristic of the second auditory stimulus relative to the characteristic of the first auditory stimulus can be related to a difference between the first location of the object with respect to the user at the first time and the second location of the object with respect to the user at the second time. A difference between a characteristic of the second auditory stimulus relative to the characteristic of the first auditory stimulus can correlative positively, or negatively, with a difference between the first location of the object with respect to the user at the first time and the second location of the object with respect to the user at the second time.

In some embodiments, the difference between the characteristic of the second auditory stimulus relative to the characteristic of the first auditory stimulus is a higher, or a lower, number of frequencies. For example, the second auditory stimulus can have a higher number of frequencies, or a broader frequency range, if the object is closer to (or further away from) the user at the second time than at the first time. As another example, the first auditory stimulus can have a higher number of frequencies, or a broader frequency range, if the object is closer to (or further away from) the user at the first time than at the second time. In some embodiments, the difference between the characteristic of the second auditory stimulus relative to the characteristic of the first auditory stimulus is a higher pitch, or a lower pitch. For example, the second auditory stimulus can have a higher pitch compared to the first auditory stimulus if the object is closer to (or further away from) the user at the second time than at the first time. As another example, the first auditory stimulus can have a higher pitch compared to the second auditory stimulus if the object is closer to (or further away from) the user at the first time than at the second time. In some embodiments, the difference between the characteristic of the second auditory stimulus relative to the characteristic of the first auditory stimulus is greater loudness or lower loudness. For example, the second auditory stimulus can be louder than the first auditory stimulus if the object is closer to (or further away from) the user at the second time than at the first time. As another example, the first auditory stimulus can be louder than the second auditory stimulus if the object is closer to (or further away from) the user at the first time than at the second time.

Object is Very Close

In some embodiments, the computing system can: receive third sensor data captured by the one or more sensors. The computing system can determine a third location of the object with respect to the user at a third time using the third sensor data. The third location of the object with respect to the user can be within a third threshold distance of the user. The second threshold distance can be, for example, 1 meter, 2 meters, 5 meters, 10 meters, 20 meters, or 100 meters. The third threshold distance can be shorter than (or longer than, or the same as) the second threshold distance. The computing system can determine (i) the one or more first auditory stimuli and the corresponding one or more first audio output devices of the plurality of output devices for outputting the one or more first auditory stimuli and (ii) the one or more second auditory stimuli and the corresponding one or more second audio output devices of the plurality of output devices for outputting the one or more second auditory stimuli using the third location of the object with respect to the user at the third time. The computing system can cause each of the one or more first and second audio output devices to output the corresponding first or second auditory stimulus of the one or more first and second auditory stimuli. For example, when the object comes behind in, for example, 5 m distance of the user, speaker 2a, 2b, or 2c as described with reference to FIG. 4E, in addition to speaker 1a, 1b, or 1c, starts generating multiple tones at high loudness.

Object is Passing-By

In some embodiments, the computing system can receive fourth sensor data captured by the one or more sensors. The computing system can determine the object is passing by, or has a likelihood above a likelihood threshold to pass by, the user at a passing-by time using the fourth sensor data. In some embodiments, the likelihood threshold of to the object to pass by the user at the passing-by time is at least 50%, 60%, 70%, 80%, 90%, 95%, or 99%. In some embodiments, the object is passing by, or has the likelihood above the likelihood threshold to pass by, the user at the passing-by time within at most 1 meter, 2 meters, 5 meters, or 10 meters, of the user. The object may not be, or is not, in a visual field of the user or may be, or is, in a far periphery of the visual field of the user at the first time. In some embodiments, the passing-by time is a time the fourth sensor data, or a portion thereof, is captured. The passing-by time can be a time after the fourth sensor data, or a portion thereof, is captured. The passing-by time can be a time immediately after (e.g., within 0.0000001 second, 0.000001 second, 0.00001 second, 0.0001 second, 0.001 second, 0.01 second, 0.1 second, or 1 second) the fourth sensor data, or a portion thereof, is captured The computing system can determine a fourth auditory stimulus to be outputted. The fourth auditory stimulus can have a characteristic that corresponds to an auditory characteristic of the object passing by the user. In some embodiments, the characteristic of the fourth auditory stimulus is selected from a group comprising a falling pitch, increasing loudness, a higher number of frequencies, a higher frequency, a regularity in angular difference, a peculiarity in angular difference, a sound shadow, a larger angular size, a loudness asymmetry for ears of the user, a head related transfer function of about 90°, a vertical location below a horizon of the user, or a combination thereof. In some embodiments, a change in the characteristic of the second auditory stimulus is at a fastest or highest at, or at about, the passing-by time.

The computing system can cause one or more of the plurality of audio output devices to output the fourth auditory stimulus to the user at an output time. The fourth auditory stimulus being outputted to the user at the output time can result in a likelihood of the user to visually perceive the object in the far periphery of the visual field of the user at the output time or a time immediately after the output time to increase. The fourth auditory stimulus being outputted to the user at the output time can result in a likelihood of the user to visually perceive the object in the far periphery of the visual field of the user at a time immediately after, such as within 0.0000001 second, 0.000001 second, 0.00001 second, 0.0001 second, 0.001 second, 0.01 second, 0.1 second, or 1 second of, the output time to increase. The fourth auditory stimulus being outputted to the user at the output time can result in a likelihood of the user to visually perceive the object in the far periphery of the visual field of the user at the output time or a time immediately after the output time to increase by, for example, by at least 10%, 20%, 30%, 40%, or 50%. For example, when the object comes into the far periphery, or extreme periphery, of the user on the dangerously close or dangerous when turning trajectory, speakers 1b and 2b or speakers 1c and 2c, respectively, in FIG. 4F generate sudden pitch falling to have cross-modal enhancement of motion detection in the far periphery, or extreme periphery.

In some embodiments, the object is in an extreme periphery of the visual field of the user at the first time. The far periphery of the visual field of the user can comprise about 60° to about 110° temporally away from a nose and towards a temple of the user. The extreme periphery of the visual field of the user can comprise about 90° to 110° temporally away from the nose and towards the temple of the user.

In some embodiments, the object is passing by, or is likely to pass by, the user on the left side of the user. To cause the one or more of the plurality of audio output devices to output the fourth auditory stimulus to the user at the output time, the computing system can cause the first left below-horizon audio output device to output the second auditory stimulus at the output time. In some embodiments, the object is passing by, or is likely to pass by, the user on the right side of the user. To cause the one or more of the plurality of audio output devices to output the fourth auditory stimulus to the user at the output time, the computing system can cause the first right below-horizon audio output device of the first contour and/or the first right below-horizon audio output device of the second contour to output the second auditory stimulus at the output time.

The method 500 ends at block 524.

Computer Vision, Machine Learning, and Neural Network
Computer Vision.

One or more computer vision algorithms can be implemented for enhancing visual motion perception and/or improving user safety (e.g., to determine the location and trajectory of an object). Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth. One or more of these computer vision algorithms can be used in trajectory prediction described herein, e.g., to determine the trajectory of a vehicle with respect to an object.

Machine Learning.

Enhancing visual motion perception and/or improving user safety can additionally or alternatively be performed by a variety of machine learning algorithms. Once trained, the machine learning algorithm can be stored in a computing system (e.g., the computing system 6 described with reference to FIG. 6). Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. One or more of the machine learning algorithms can be used in trajectory prediction described herein, e.g., to determine the trajectory of a vehicle with respect to an object.

Neural Network.

A layer of a neural network (NN), such as a deep neural network (DNN) can apply a linear or non-linear transformation to its input to generate its output. A neural network layer can be a normalization layer, a convolutional layer, a softsign layer, a rectified linear layer, a concatenation layer, a pooling layer, a recurrent layer, an inception-like layer, or any combination thereof. The normalization layer can normalize the brightness of its input to generate its output with, for example, L2 normalization. The normalization layer can, for example, normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have a mean of zero and a variance of one (or other values of mean and variance). Local response normalization can normalize an image over local input regions to have a mean of zero and a variance of one (or other values of mean and variance). The normalization layer may speed up the training process.

The convolutional layer can apply a set of kernels that convolve its input to generate its output. The softsign layer can apply a softsign function to its input. The softsign function (softsign(x)) can be, for example, $(x/(1+|x|))$. The softsign layer may neglect impact of per-element outliers. The rectified linear layer can be a rectified linear layer unit (ReLU) or a parameterized rectified linear layer unit (PReLU). The ReLU layer can apply a ReLU function to its input to generate its output. The ReLU function ReLU(x) can be, for example, max(0, x). The PReLU layer can apply a PReLU function to its input to generate its output. The PReLU function PReLU(x) can be, for example, x if x≥0 and ax if x<0, where a is a positive number. The concatenation layer can concatenate its input to generate its output. For example, the concatenation layer can concatenate four 5×5 images to generate one 20×20 image. The pooling layer can apply a pooling function which down samples its input to generate its output. For example, the pooling layer can down sample a 20×20 image into a 10×10 image. Non-limiting examples of the pooling function include maximum pooling, average pooling, or minimum pooling.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as its input the hidden state s(t) of the recurrent layer at time t. The recurrent layer can compute the hidden state s(t+1) by applying, for example, a ReLU function to its input. The inception-like layer can include one or more of the normalization layer, the convolutional layer, the softsign layer, the rectified linear layer such as the ReLU layer and the PReLU layer, the concatenation layer, the pooling layer, or any combination thereof.

The number of layers in the NN can be different in different implementations. For example, the number of layers in the DNN can be 50, 100, 200, or more. The input type of a deep neural network layer can be different in different implementations. For example, a layer can receive the outputs of a number of layers as its input. The input of a layer can include the outputs of five layers. As another example, the input of a layer can include 1% of the layers of the NN. The output of a layer can be the inputs of a number of layers. For example, the output of a layer can be used as the inputs of five layers. As another example, the output of a layer can be used as the inputs of 1% of the layers of the NN.

The input size or the output size of a layer can be quite large. The input size or the output size of a layer can be n×m, where n denotes the width and m denotes the height of the input or the output. For example, n or m can be 11, 21, 31, or more. The channel sizes of the input or the output of a layer can be different in different implementations. For example, the channel size of the input or the output of a layer can be 4, 16, 32, 64, 128, or more. The kernel size of a layer can be different in different implementations. For example, the kernel size can be n×m, where n denotes the width and m denotes the height of the kernel. For example, n or m can be 5, 7, 9, or more. The stride size of a layer can be different in different implementations. For example, the stride size of a deep neural network layer can be 3, 5, 7 or more.

In some embodiments, a NN can refer to a plurality of NNs that together compute an output of the NN. Different NNs of the plurality of NNs can be trained for different tasks. A processor (e.g., the processor 610 described with reference to FIG. 6) can compute outputs of NNs of the plurality of NNs to determine an output of the NN. For example, an output of a NN of the plurality of NNs can include a likelihood score. The processor can determine the output of the NN including the plurality of NNs based on the likelihood scores of the outputs of different NNs of the plurality of NNs.

Execution Environment

Figure 6:
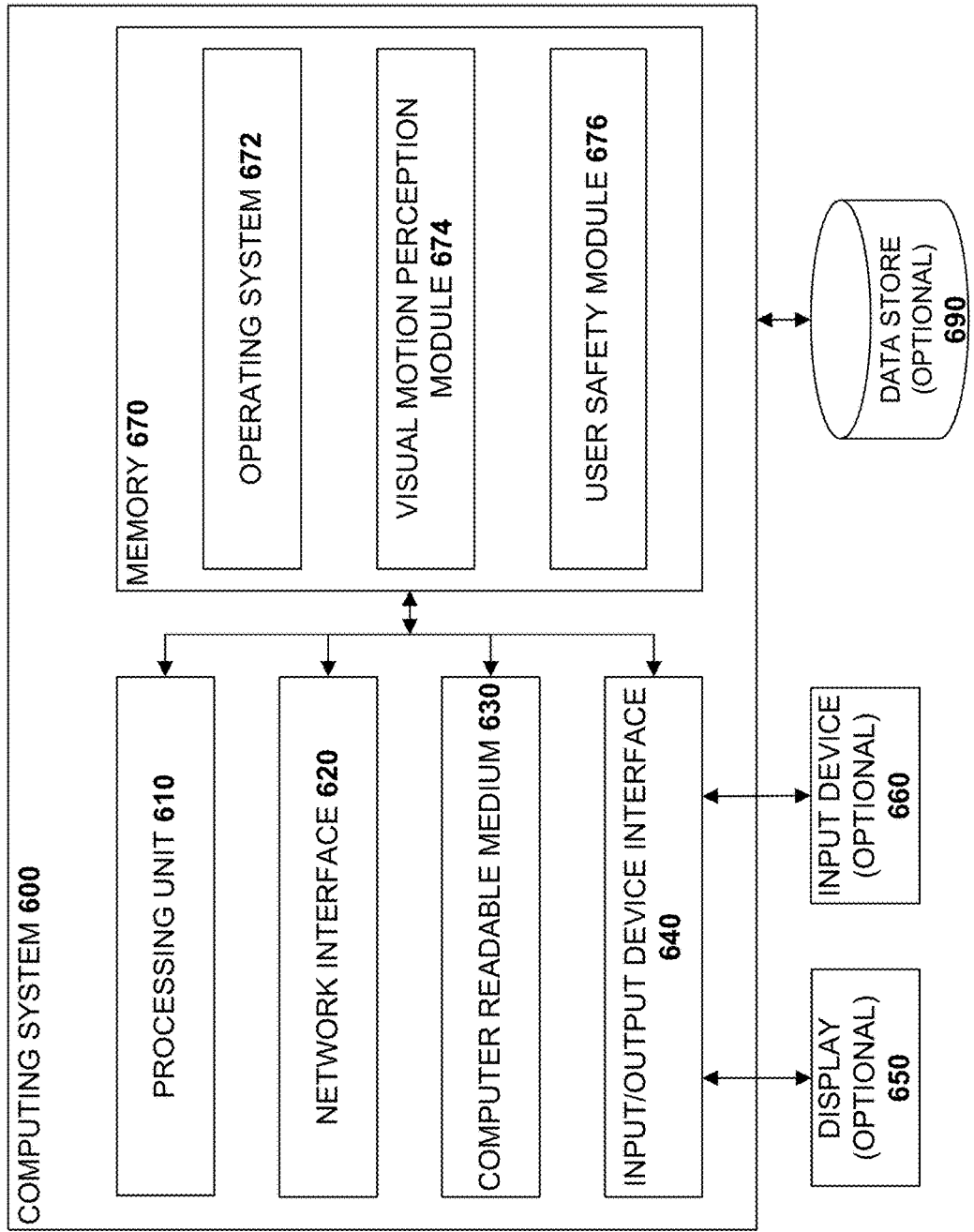
FIG. 6 is a block diagram of an illustrative computing system configured to implement any method of the present disclosure.

In FIG. 6 depicts a general architecture of an example computing device 600 configured to implement the metabolite, annotation and gene integration system disclosed herein. The general architecture of the computing device 600 depicted in FIG. 6 includes an arrangement of computer hardware and software components. The computing device 600 may include many more (or fewer) elements than those shown in FIG. 6. It is not necessary, however, that all of these generally conventional elements be shown in order to provide an enabling disclosure. As illustrated, the computing device 600 includes a processing unit 610, a network interface 620, a computer readable medium drive 630, an input/output device interface 640, a display 650, and an input device 660, all of which may communicate with one another by way of a communication bus. The network interface 620 may provide connectivity to one or more networks or computing systems. The processing unit 610 may thus receive information and instructions from other computing systems or services via a network. The processing unit 610 may also communicate to and from memory 670 and further provide output information for an optional display 650 via the input/output device interface 640. The input/output device interface 640 may also accept input from the optional input device 660, such as a keyboard, mouse, digital pen, microphone, touch screen, gesture recognition system, voice recognition system, gamepad, accelerometer, gyroscope, or other input device.

The memory 670 may contain computer program instructions (grouped as modules or components in some embodiments) that the processing unit 610 executes in order to implement one or more embodiments. The memory 670 generally includes RAM, ROM and/or other persistent, auxiliary or non-transitory computer-readable media. The memory 670 may store an operating system 672 that provides computer program instructions for use by the processing unit 610 in the general administration and operation of the computing device 600. The memory 670 may further include computer program instructions and other information for implementing aspects of the present disclosure.

For example, in one embodiment, the memory 670 includes a visual motion perception module 674 for enhancing visual motion perception, such as the method 200 described with reference to FIG. 2. The memory 670 may additionally or alternatively include a user safety module 676 for improving user safety, such as the method 500 described with reference to FIG. 5. In addition, memory 670 may include or communicate with the data store 690 and/or one or more other data stores that stores computer program instructions that the memory 670 can store.

EXAMPLES

Some aspects of the embodiments discussed above are disclosed in further detail in the following example, which is not in any way intended to limit the scope of the present disclosure.

Example 1

Enhancing Visual Motion Perception in the Far Periphery and Extreme Periphery

The effects of auditory stimuli on detecting extreme-peripheral visual motion from behind were investigated.

Being able to perceive the extreme periphery can be ecologically critical for a subject (e.g., a mammal, or a human) because the extreme periphery can be the subject's first contact point with an object from out-of-sight. The extreme periphery can be considered a gateway into a subject's vision. When an object comes to the subject from behind, the subject's first contact point with the object can be the subject's the extreme periphery. When the subject turns his or her head to an object behind the subject, again, the subject's first contact point with the object can be the subject's extreme periphery.

Human beings have developed many technologies to see object in the extreme periphery. For example, a car can have two mirrors that allow a driver of the car to see an object in the driver's extreme periphery. A car can have a blind spot alert system which aims to facilitate a driver's vision in the extreme periphery. Facilitating vision in the extreme periphery can be highly important for a person's daily life, such as driving a car, or riding a motorcycle.

Surprisingly, very little is known about the vision in the extreme periphery. One possible way to facilitate vision in the extreme periphery is cross-modal modulation. Concurrent auditory stimuli may be able to facilitate visual perception such as detection. Cross-modal modulation may be stronger in the periphery than in the fovea. Concurrent auditory stimuli may facilitate vision in the extreme periphery.

Concurrent Auditory Stimuli Suppressed Visual Motion Detection in the Extreme Periphery To examine the cross-modal effect in the extreme periphery, whether human subjects can perform simple visual detection task in the extreme periphery with or without auditory stimuli, such as beep, was investigated. In the experiment, a single flash appeared in left or right extreme periphery of a subject. The target location was individually determined, and the average was 96.8 degrees from a subject's fovea. The auditory stimuli included concurrent white noise, concurrent brown noise, and concurrent 500 Hz beep. The baseline was a no-sound condition. Surprisingly, none of the three auditory stimuli facilitated visual detection. Two of the three auditory stimuli (white noise and concurrent 500 Hz beep) suppressed the detection. Similar suppression was observed with beeps from monaural headphones.

Cross-modal suppression may be a result of the auditory stimuli such as beep or white noise being completely irrelevant to the visual stimuli and the task. Concurrent but irrelevant auditory stimuli could suppress visual perception. Auditory becomes critical when reliability of vision is reduced. Without being bound by theory, the observation of cross-modal suppression by irrelevant auditory stimuli could be a result of the vision in the extreme periphery being highly noisy and thus susceptible to auditory input.

Concurrent Auditory Stimuli Facilitated Visual Motion Detection in the Extreme Periphery Auditory stimuli associated (e.g., highly associated) with visual stimuli may be required for cross-modal facilitation in the extreme-periphery. Certain motions are associated with distinctive sounds. Detecting a passing-by object from behind can be an important ecologically critical situation. Passing-by motion in the extreme-periphery can be physically associated with distinctive falling pitch shift. The pitch of the sound, which comes from the object, can have sudden fall at around 90 degree of a subject's vision. Such distinctive falling pitch shift occurs in the subject's extreme periphery.

In an experiment to determine whether detection of such forward motion can be facilitated by a distinctive falling pitch shift, a sequence of two 204 millisecond (ms) dots (306 ms stimulus onset asynchrony (SOA)) was presented in the extreme periphery of each subject. The extreme periphery was determined to be the largest eccentricity with 75% detection for each subject. Each dot was presented at two adjacent locations with 2° distance so as to have apparent motion forward, or at the same location. As auditory stimuli, concurrent beep with falling pitch was employed. Concurrent beep with falling pitch can roughly imitate a Doppler pitch shift for a passing-by object. Concurrent beep with rising pitch was used as a control, in addition to another no sound control. The results showed the concurrent beep with falling pitch increased the hit rate for motion detection, relative to that with no sound and concurrent beep with rising pitch.

Figure 8:
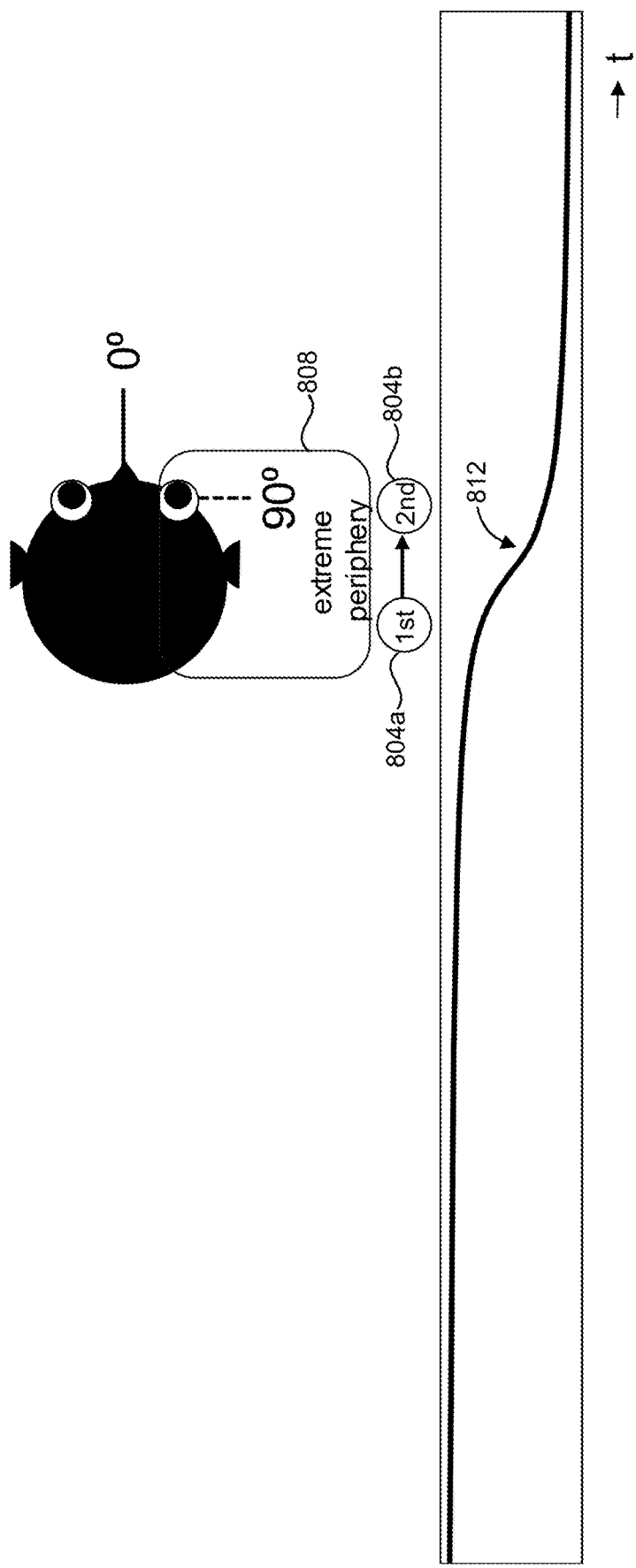
FIG. 8 is a non-limiting exemplary schematic illustration of an experiment setup for determining whether auditory affects detecting extreme-peripheral visual motion from behind.

FIG. 8 is a non-limiting exemplary schematic illustration of the experiment setup for determining whether auditory affects detecting extreme-peripheral visual motion from behind. Preliminary detection was performed to determine the left or right 75% detectable point of each subject. The first flash appeared at 75% detectable point of a subject, and then the second flash appeared at the same location of the first flash (to simulate no motion), or two degrees forward from the first flash (to stimulate forward motion). If the second flash appeared at the same location as the first flash, then the subject should observe no motion. If the second flash appeared at two degrees forward from the first flash, then the subject should observe forward motion.

Figure 7:
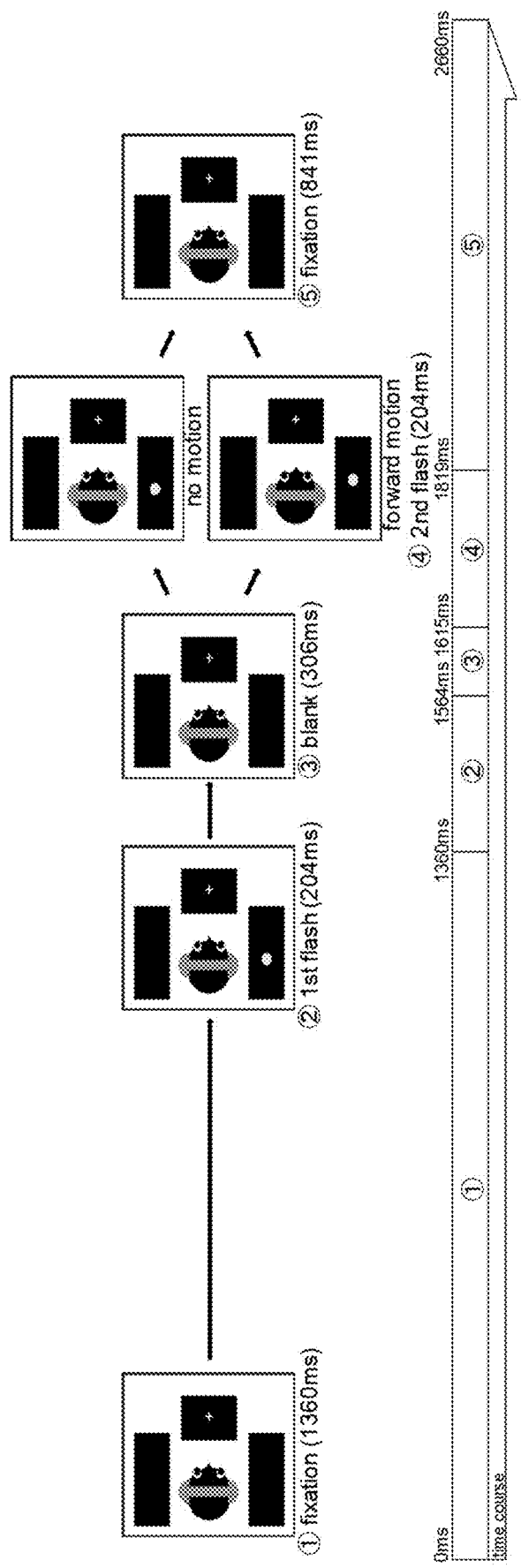
FIG. 7 is a non-limiting exemplary schematic illustration of an experiment setup for determining whether auditory stimuli with falling pitch affects detecting extreme-peripheral visual motion from behind.
Figure 9:
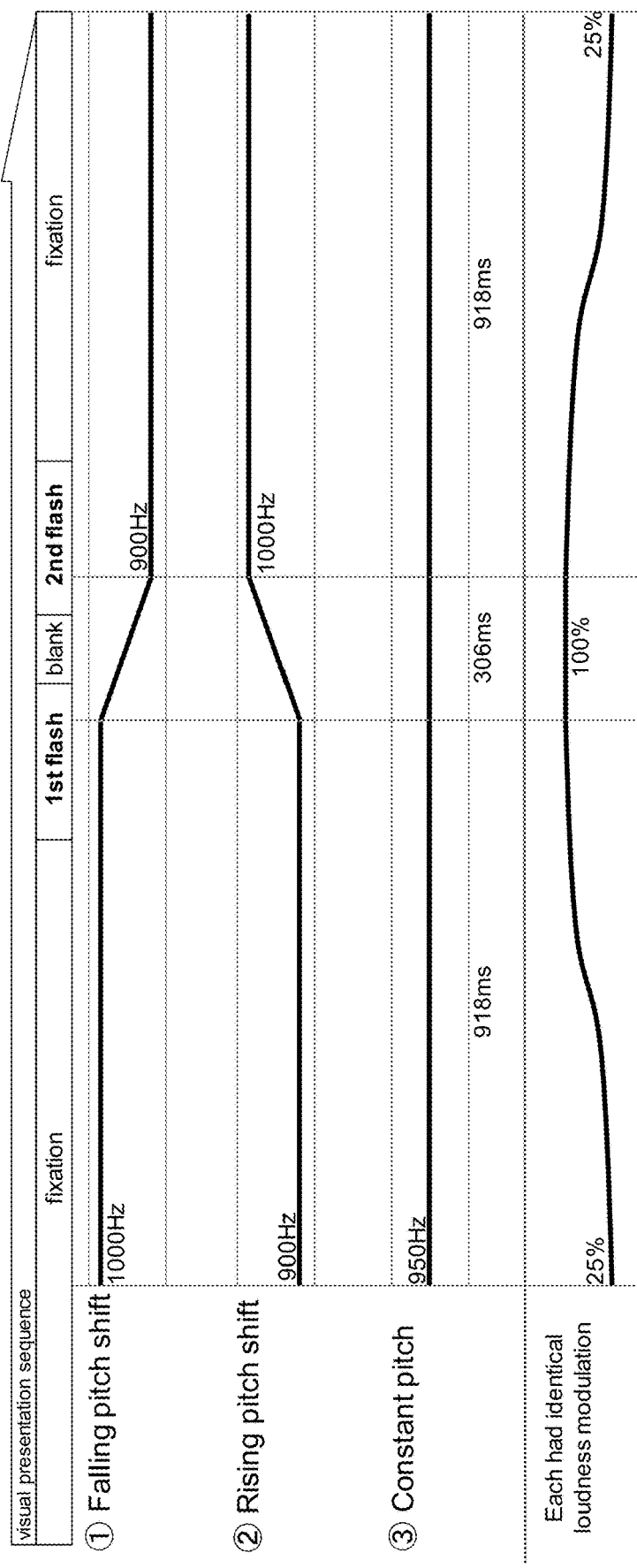
FIG. 9 is a non-limiting exemplary schematic illustration of an experiment setup for determining the effects of three types of auditory stimuli on detecting extreme-peripheral visual motion from behind.

Apparent forward motion was simulated by two successive nearby flashes 704a, 704b in the subject's extreme periphery 708. Whether detection of such forward motion can be facilitated by a distinctive falling pitch shift 712 was investigated as shown in FIG. 7. The motion detection was coupled with one of the three sounds shown in FIG. 9 that had individual pitch shift pattern. In the falling pitch shift condition, the pitch of a sound suddenly decreased from 1000 Hz to 900 Hz during the first and second flash presentation. For a control condition, the pitch of a sound suddenly increased from 900 Hz to 1000 Hz during the first and second flash presentation. For another control, the pitch of the sound was set to 950 Hz constantly. The three sounds had identical loudness modulation to imitate an approaching and then leaving object.

Figure 10:
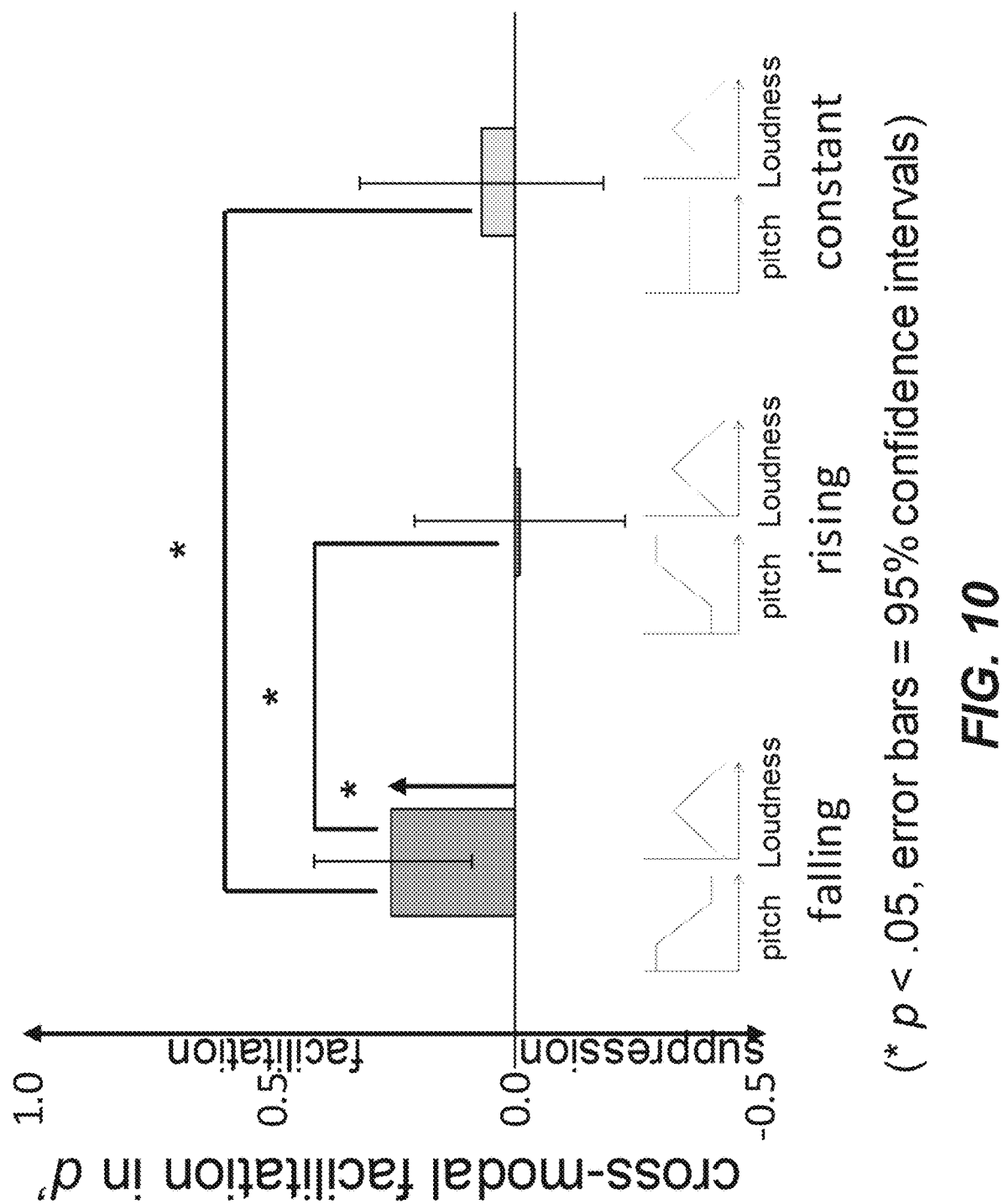
FIG. 10 is a non-limiting exemplary plot showing the effects of three types of auditory stimuli on detecting extreme-peripheral visual motion from behind.

FIG. 10 is a non-limiting exemplary plot showing the effects of the three types of auditory stimuli on detecting extreme-peripheral visual motion from behind. The results for the cross-modal facilitation is shown in terms of the difference of d', calculated using the signal detection theory, between each sound condition and the no-sound baseline. The effect of auditory stimuli was $F(1, 17)=8.27$, $p.=0.010$, where $F(1, 17)$ is the F value from analysis of variance (ANOVA) with degrees of freedoms of 1 and 17. The cross-modal facilitation was significantly larger with the falling pitch shift condition, relative to the rising pitch shift condition and the constant pitch condition ($p=0.031$ and $p=0.031$, respectively). Such cross-modal facilitation was larger than zero only with the falling pitch shift condition ($p=0.010$). The results clearly showed the falling pitch shift condition facilitated forward motion detection in the extreme-periphery. A constant pitch control with loudness change having a peak at 90 degrees had no facilitation effect. Loudness change imitating a passing-by object may not to be sufficient to facilitate motion detection in the extreme periphery. Decreasing pitch shift may be an important cue for detection of a "passing-by" object in the extreme-periphery.

Each subject completed a post-hoc questionnaire. The post-hoc questionnaire was used to determine each subject' knowledge about the relationship between the sound heard by the subject and the motion that would elicit the sound heard by the subject. Options for the motion included "moving toward you," "moving away from you," "passing by you," "moving around you at the same distance," "moving across you," and "none of the above." Surprisingly, almost no one could identify the correct motions. Only two (11.8%) of the subjects who heard the sound with the falling pitch shift condition correctly identified the motion of an object "passing by you" that would elicit the sound heard. None of the subjects who heard the sound with the rising pitch shift condition correctly identified that "none of the above" motions that would elicit the sound heard. Only one (5.9%) of the subjects who heard the sound with the constant pitch condition correctly identified that "none of the above" motions would elicit the sound heard. The subjects' lack of knowledge about the motions that would elicit the sounds heard by the subjects meant the observed cross-modal facilitation cannot be explained only by knowledge-based effect.

Concurrent cross-modal stimuli that are naturally and ecologically associated with visual stimuli can facilitate extreme-peripheral visual perception. Such ecologically relevant auditory stimuli can facilitate visual perception in the extreme-periphery even if the subject cannot perceive auditory stimuli correctly and/or the subject does not have top-down knowledge about the association between auditory and visual stimuli. A falling pitch shift condition, not loudness change, can facilitate forward motion detection in the extreme periphery. A loudness change does not necessarily indicate a passing-by object and may be irrelevant for cross-modal facilitation. Auditory stimuli unique to the visual stimuli may facilitate cross-modal facilitation.

Altogether, these data show that adding a falling pitch shift to a sound can facilitate forward visual motion detection in the extreme-periphery.

ADDITIONAL CONSIDERATIONS

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

One skilled in the art will appreciate that, for this and other processes and methods disclosed herein, the functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. As used in this specification and the appended claims, the singular forms "a," "an," and "the" include plural references unless the context clearly dictates otherwise. Accordingly, phrases such as "a device configured to" are intended to include one or more recited devices. Such one or more recited devices can also be collectively configured to carry out the stated recitations. For example, "a processor configured to carry out recitations A, B and C can include a first processor configured to carry out recitation A and working in conjunction with a second processor configured to carry out recitations B and C. Any reference to "or" herein is intended to encompass "and/or" unless otherwise stated.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

It will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for improving visual motion perception comprising:
   non-transitory memory configured to store executable instructions;
   an audio output device; and
   a hardware processor in communication with the non-transitory memory, the image capture device, and the audio output device, the hardware processor programmed by the executable instructions to:
   receive a plurality of images captured by an image capture device;
   determine a location and a trajectory of an object with respect to a user at a first time using the plurality of images,
      wherein the location and the trajectory of the object with respect to the user at the first time indicate the object has a likelihood above a likelihood threshold to pass by the user at a passing-by time, wherein the object is not in a visual field of the user or is in a far periphery or extreme periphery of the visual field of the user at the first time and/or the passing-by time, and wherein the far periphery of the visual field of the user comprises about 60° to about 110° temporally away from a nose and towards a temple of the user, and/or wherein the extreme periphery of the visual field of the user comprises about 90° to 110° temporally away from the nose and towards the temple of the user;

determine an auditory stimulus and an output time to output the auditory stimulus based on the location and the trajectory of the object with respect to the user at the first time, wherein the output time is the passing-by time, or the output time is between the first time and the passing-by time, and wherein a characteristic of the auditory stimulus is selected from a group comprising a falling pitch; and cause the audio output device to output the auditory stimulus to the user at the output time, thereby increasing a likelihood of the user to visually perceive the object in the far periphery of the visual field of the user at the output time or a time immediately after the output time.

2. The system of claim 1, wherein to receive the plurality of images, the hardware processor is programmed by the executable instructions to: receive sensory data comprising the plurality of images captured by one or more sensors, wherein the one or more sensors comprise the image capture device, a Radio Detection and Ranging (Radar), a Light Detection and Ranging (Lidar), an audio capture device, or a combination thereof, wherein to determine the location and the trajectory of the object with respect to the user at the first time, the hardware processor is programmed by the executable instructions to: determine the location and the trajectory of the object with respect to the user at the first time using the sensor data, or wherein to determine the object is passing by, or has the likelihood above the likelihood threshold to pass by, the user at the passing-by time, the hardware processor is programmed by the executable instructions to: determine the object is passing by, or has the likelihood above the likelihood threshold to pass by, the user at the passing-by time using the sensor data.

3. The system of claim 2, wherein the system comprises the one or more sensors or one or more of the one or more sensors.

4. The system of claim 2, wherein to receive the sensor data, the hardware processor is programed by the executable instructions to: receive the sensor data captured by the one or more sensors from a second system.

5. The system of claim 2, wherein the hardware processor is programmed by the executable instructions to: transmit the sensor data, the location and the trajectory of the object with respect to the user at the first time, and/or an indication that the object is passing by, or has the likelihood above the likelihood threshold to pass by, the user at the passing-by time to a third system.

6. The system of claim 1, wherein a helmet, a car audio system, or a wearable speaker system or device, is associated with, comprises, or comprised in, the system, or a portion thereof.

7. The system of claim 1, wherein the object is a first motor vehicle.

8. The system of claim 1, wherein the user is in a second motor vehicle or is riding the second motor vehicle.

9. The system of claim 1, wherein the hardware processor is programmed by the executable instructions to: determine the object has the likelihood above the likelihood threshold to pass by the user at the passing-by time based on the location and the trajectory of the object with respect to the user at the first time.

10. The system of claim 1, wherein the likelihood threshold of to the object to pass by the user at the passing-by time is at least 50%.

11. The system of claim 1, wherein the location and the trajectory of the object with respect to the user at the first time indicate the object has the likelihood above the likelihood threshold to pass by the user at the passing-by time within at most 10 meters of the user.

12. The system of claim 1, wherein the characteristic of the auditory stimulus is selected from a group comprising a falling pitch, increasing loudness, a higher number of frequencies, a higher frequency, a regularity in angular difference, a peculiarity in angular difference, a sound shadow, a larger angular size, a loudness asymmetry for ears of the user, a head related transfer function of about 90°, a vertical location below a horizon of the user, or a combination thereof.

13. The system of claim 1, wherein a change in the characteristic of the auditory stimulus is at a fastest or highest at, or at about, the passing-by time.

14. The system of claim 1, wherein the auditory stimulus comprises a narrow range of frequencies or a pure tone.

15. The system of claim 1, wherein the auditory stimulus comprises music, speech, or a combination thereof.

16. The system of claim 1, wherein the first time is a time the plurality of images, or a portion thereof, is captured, wherein the first time is a time after the plurality of images, or a portion thereof, is captured, or wherein the first time is a time immediately after the plurality of images, or a portion thereof, is captured.

17. The system of claim 1, wherein the location and the trajectory of the object with respect to the user indicate the object is likely to pass by the user on a left side or a right side of the user at the passing-by time, wherein the audio output device comprises a left audio output device and a right audio output device configured to output the auditory stimulus to a left ear and a right ear of the user, respectively, and wherein to cause the audio output device to output the auditory stimulus to the user at the output time, the hardware processor is programmed by the executable instructions to: cause the left audio output device or the right audio output device to output the auditory stimulus to the left ear or the right ear of the user, respectively, at the output time.

18. The system of claim 1, wherein the output time is the passing-by time, the output time is immediately prior to the passing-by time, or the output time is between the first time and the passing-by time.

19. The system of claim 1, thereby increasing the likelihood of the user to visually perceive the object in the far periphery of the visual field of the user at the output time or the time immediately after the output time by at least 10%.

20. A method for improving visual motion perception comprising:

under control of a hardware processor:
receiving sensor data captured by one or more sensors;
determining a location and a trajectory of an object with respect to a subject at a first time using the sensor data, wherein the sensor data comprises a location, a speed, and a direction of the object captured by one or more telemetry and location sensors associated with the object or the subject, wherein the one or more sensors comprise the one or more telemetry and location sensors associated with the object or the subject, wherein the one or more telemetry and location sensors associated with the object comprises a first global positioning system (GPS) sensor associated with the object, and wherein the one or more telemetry and location sensors associated with the subject comprise a second global positioning system (GPS) sensor associated with the subject, wherein the location and the trajectory of the object with respect to the subject at the first time indicate the object has a likelihood above a likelihood threshold to be moving relative to the subject within a threshold distance of the subject at a second time, and wherein the object is not in a visual field of the subject or is in a periphery of the visual field of the subject at the first time;

determining an auditory stimulus based on the location and the trajectory of the object with respect to the subject at the first time, wherein a characteristic of the auditory stimulus corresponds to an auditory characteristic of the object moving relative to the subject within the threshold distance of the subject; and causing the auditory stimulus to be outputted to the subject at an output time, thereby increasing a likelihood of the subject to visually perceive the object in the periphery of the visual field of the subject at the output time or a time immediately after the output time.

21. A system for user safety comprising:

non-transitory memory configured to store executable instructions;

one or more sensors associated with a helmet, or a wearable device, for capturing different types of sensor data;

a plurality of audio output devices for outputting auditory stimuli that mimic sounds from (1a) the horizon and (1b) below the horizon of a user and from (2a) the left side of, (2b) directly behind, and (2c) the right side of the user; and a hardware processor in communication with the non-transitory memory, the hardware processor programmed by the executable instructions to:

receive first sensor data captured by the one or more sensors;

determine a first location of an object with respect to the user at a first time using the first sensor data, wherein the first location of the object with respect to the user is within a first threshold distance of the user;

determine one or more first auditory stimuli and corresponding one or more first audio output devices of the plurality of output devices for outputting the one or more first auditory stimuli using the first location of the object with respect to the user at the first time, wherein a characteristic of the first auditory stimulus is related to a property of the object, wherein the characteristic of the first auditory stimulus comprises a pitch and/or a loudness of the first auditory stimulus, wherein the characteristic of the first auditory stimulus is related to the property of the object comprising a size or a speed of the object, and wherein the pitch and/or the loudness of the first auditory stimulus correlates positively, or negatively, with the size and/or speed of the object; and cause each of the one or more first audio output devices to output the corresponding first auditory stimulus of the one or more first auditory stimuli.

22. The system of claim 21, wherein the characteristic of the first auditory stimulus comprises the pitch of the first auditory stimulus, wherein the characteristic of the first auditory stimulus is related to the size of the object, and wherein the pitch of the first auditory stimulus correlates positively, or negatively, with the size of the object.

23. The system of claim 21, wherein the characteristic of the first auditory stimulus comprises the loudness of the first auditory stimulus, wherein the characteristic of the first auditory stimulus is related to the speed of the object, and wherein the loudness of the first auditory stimulus correlates positively, or negatively, with the speed of the object.

24. The system of claim 21, wherein the hardware processor is programmed by the executable instructions to:

receive second sensor data captured by the one or more sensors;

determine a second location of the object with respect to the user at a second time using the second sensor data, wherein the second location of the object with respect to the user is within a second threshold distance of the user, wherein the second threshold distance is shorter, or longer, than the first threshold distance;

determine one or more second auditory stimuli and corresponding one or more second audio output devices of the plurality of output devices for outputting the one or more second auditory stimuli using the second location of the object with respect to the user at the second time, wherein a characteristic of the second auditory stimulus is related to the property of the object, and wherein a difference between a characteristic of the second auditory stimulus relative to the characteristic of the first auditory stimulus is related to the second location of the object with respect to the user at the second time; and cause each of the one or more second audio output devices to output the corresponding second auditory stimulus of the one or more second auditory stimuli.

25. The system of claim 24, wherein the difference between the characteristic of the second auditory stimulus relative to the characteristic of the first auditory stimulus is a higher, or a lower, number of frequencies or greater loudness or lower loudness.

* * * * *